(12) United States Patent
Meingast et al.

(10) Patent No.: US 11,611,451 B1
(45) Date of Patent: Mar. 21, 2023

(54) MOVEMENT PATH DETECTION FOR ANOMALIES AND PATTERNS FROM SENSORS IN A HOME OR OTHER ENVIRONMENT

(71) Applicant: GOOGLE LLC, Mountain View, CA (US)

(72) Inventors: Marci Meingast, San Francisco, CA (US); Adam Cutbill, Palo Alto, CA (US)

(73) Assignee: Google LLC, Mountain View, CA (US)

(*) Notice: Subject to any disclaimer, the term of this patent is extended or adjusted under 35 U.S.C. 154(b) by 179 days.

(21) Appl. No.: 16/894,014

(22) Filed: Jun. 5, 2020

(51) Int. Cl.
| | |
|---|---|
| *H04L 12/28* | (2006.01) |
| *H04L 41/12* | (2022.01) |
| *H04L 67/12* | (2022.01) |
| *H04L 67/50* | (2022.01) |
| H04W 84/18 | (2009.01) |
| H04W 88/08 | (2009.01) |

(52) U.S. Cl.
CPC ............ *H04L 12/282* (2013.01); *H04L 41/12* (2013.01); *H04L 67/12* (2013.01); *H04L 67/535* (2022.05); *H04W 84/18* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2013/0314210 | A1* | 11/2013 | Schoner | G06Q 90/20 340/8.1 |
| 2018/0225780 | A1* | 8/2018 | Boss | H04W 12/68 |
| 2020/0345307 | A1* | 11/2020 | Gray | A61B 5/002 |
| 2020/0404007 | A1* | 12/2020 | Singh | H04L 63/1416 |

FOREIGN PATENT DOCUMENTS

WO   WO-2021107360 A2 *  6/2021  ......... G06F 16/2246

* cited by examiner

*Primary Examiner* — Jenkey Van
(74) *Attorney, Agent, or Firm* — Kilpatrick Townsend & Stockton LLP

(57) ABSTRACT

A method for detecting a movement path in a monitored environment generates a first movement path record by collecting first node information for each of a first series of nodes including at least one of a sensor ID or a device ID, and a trigger time. The method further determines a first movement path total duration time from a difference between a time of the ending node and a time of the starting node of the first series of nodes. The method further stores the first movement path record and subsequently compares a second movement path record with the first movement path record by comparing the first node information with second node information for each of a second series of nodes of the second movement path record, and the first movement path total duration time with a second movement path total duration time. The method determines a similarity value between the second movement path record and the first movement path record based on the comparison and detects a movement path based on the determined similarity value.

13 Claims, 14 Drawing Sheets

MOVEMENT PATH DETECTION FOR ANOMALIES AND PATTERNS FROM SENSORS IN A HOME OR OTHER ENVIRONMENT

BACKGROUND

In a home or other environment, there are typical patterns of movement that happen on a recurring basis. For example, in the evening, during the week it might be common for an occupant to go from the kitchen to the living room after the family finishes dinner and goes to watch some media. In the morning, movement from the bedroom to the kitchen commonly happens as a person wakes up and gets breakfast.

Homes having network-connected sensors and network-connected devices, in which multiple sensors and devices are connected to a wireless communication system to form a multiple node mesh-type network are becoming more typical.

BRIEF SUMMARY

According to an embodiment of the disclosed subject matter, a computer-implemented method for detecting a movement path in a monitored environment includes generating a first movement path record by collecting first node information for each of a first series of nodes. Each first node information includes at least one of a sensor identification (ID) or a device ID, and a trigger time. The method further determines a starting node and an ending node from the first series of nodes based on respective trigger times and determines a first movement path total duration time from a difference between a time of the ending node and a time of the starting node of the first series of nodes. The method further includes storing the first movement path record with a first movement path record weight value.

The method further generates a second movement path record by collecting second node information for each of a second series of nodes, where each second node information includes at least one of a sensor ID or a device ID, and a trigger time. A starting node and an ending node from the second series of nodes is determined based on respective trigger times. A second movement path total duration time is determined from a difference between a time of the ending node and a time of the starting node of the second series of nodes.

The second movement path record is compared with the first movement path record by comparing the first node information for each of the first series of nodes and the second node information for each of the second series of nodes, and compares the first movement path total duration time and the second movement path total duration time.

A similarity value is determined between the second movement path record and the first movement path record and a movement path is detected based on the determined similarity value between the second movement path record and the first movement path record.

According to an embodiment of the disclosed subject matter, a means for detecting a movement path in a monitored environment, includes generating a first movement path record by collecting first node information for each of a first series of nodes, where each first node information including at least one of a sensor ID or a device ID, and a trigger time. A starting node and an ending node is determined from the first series of nodes based on respective trigger times, and a first movement path total duration time is determined from a difference between a time of the ending node and a time of the starting node of the first series of nodes. The means for detecting further includes means for storing the first movement path record with a first movement path record weight value.

The means for detecting further includes generating a second movement path record by collecting second node information for each of a second series of nodes, where each second node information includes at least one of a sensor ID or a device ID, and a trigger time. A starting node and an ending node is determined from the second series of nodes based on respective trigger times, and a second movement path total duration time is determined from a difference between a time of the ending node and a time of the starting node of the second series of nodes.

The means for detecting further includes means for comparing the second movement path record with the first movement path record by comparing at least one of the first node information for each of the first series of nodes and the second node information for each of the second series of nodes, and the first movement path total duration time and the second movement path total duration time.

The means for detecting further includes means for determining a similarity value between the second movement path record and the first movement path record by detecting a movement path based on the determined similarity value between the second movement path record and the first movement path record.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in, and constitute a part of this specification. The drawings also illustrate embodiments of the disclosed subject matter and together with the detailed description explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
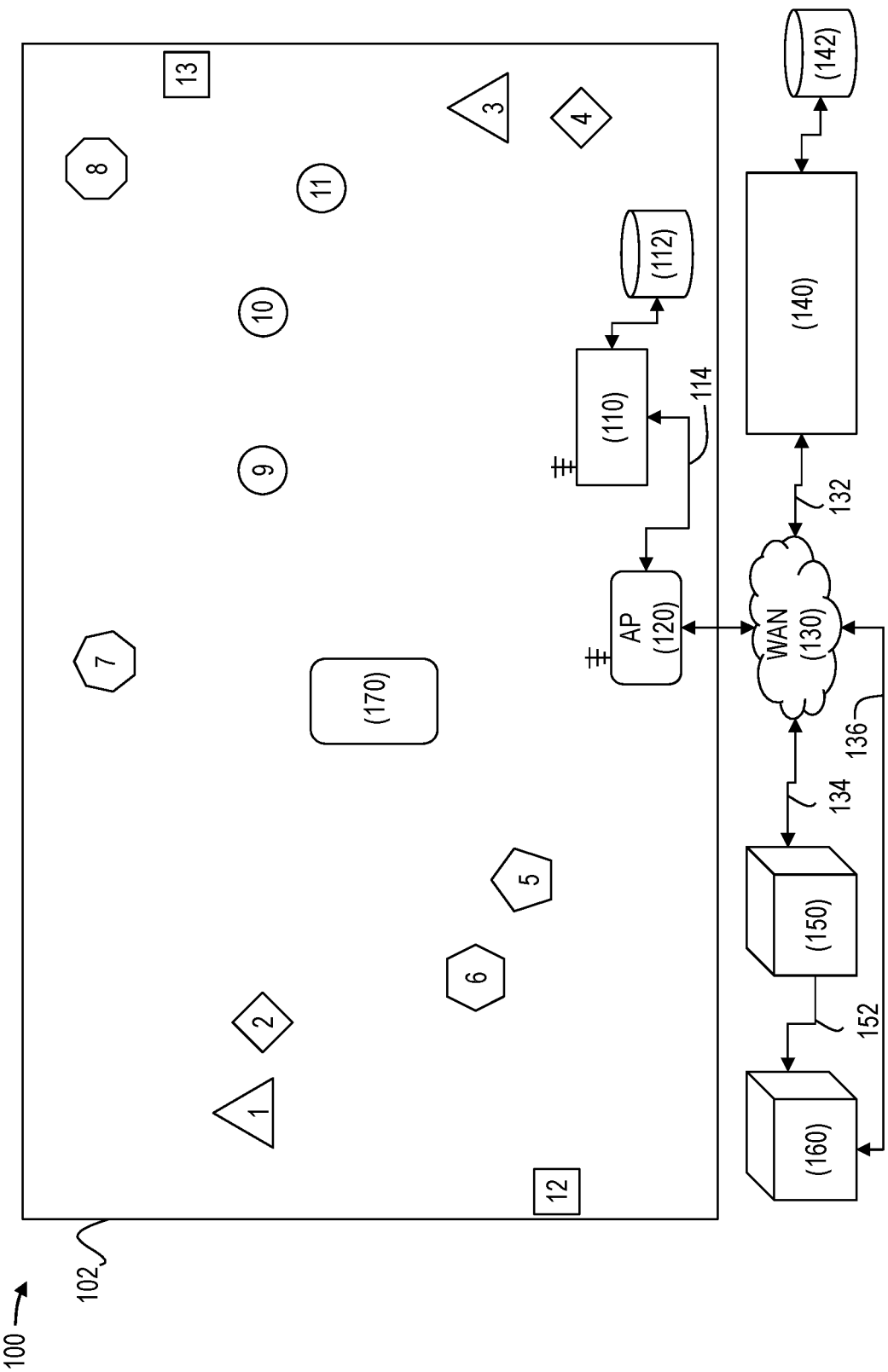
FIG. 1 illustrates a monitoring system operating in a monitored environment including a plurality of network-connected sensors and network-connected devices.

It may be desirable to have a system detect and identify movement paths for patterns or routines of users in homes based on network-connected sensors and network-connected devices, so as to enable devices or other home features that may complement a user's pattern or routine. It may be further desirable for the system to detect an anomalous movement path that does not comply with a previously identified movement path, such that a determination may be made by the system as to whether to alert a user or a remote monitoring system and/or emergency services based on the identity of the user and/or sensing an anomalous movement path.

Monitoring systems based in the home, office or any location having network-connected sensors and network-connected devices may learn user movement paths in real-time based on network-connected sensors and the user's interaction with network-connected devices.

With the different sensors and devices in the home, typical movement paths for the home may be learned over time. In any monitored environment subject to a monitoring system, as occupants of a home, employees within a business, customers within a retail store space, or public members within a public space traverse the structure or space of their monitored environment, they trigger network-connected sensors and interact with network-connected devices.

Sensed input may come from any trigger signal output from, for example, a network-connected motion sensor detecting a user in a detection field of proximity, a user opening or closing a door or window with an associated position sensor, a user touching or interacting with a network-connected device to adjust a particular parameter setting. Sensed input may additionally come from a user that may be sensed and/or identified by a camera in its field of view, a door or window that may be open or shut by a position sensor, and a Access Point (AP) determining a network-connected user device. Sensed input may further come from an associated user identity or hardware address of the user device, or a direction of motion of the user device based on detecting a signal strength pattern of the user device over a period of time.

By recording these signals over time and applying machine learning techniques, a common movement path, or a weighted pattern record, may be learned from a user's interactions with the monitored environment and the user's time-based interactions with the monitored environment, as well as the context in which these movement paths are done. For example, on Tuesday afternoons, a user may move from the kitchen to the dining room, and every Wednesday morning another user moves from the bedroom to the kitchen.

Once movement paths are learned, the monitoring system better understands how the monitored environment is used and then additional functions may be provided by the monitoring system to interact with the network-connected devices in the monitored environment. Examples may include having media, that may be played back on a first media device, follow a particular user to different media playback device, or turning on a network-connected light(s) or powering on a network-connected light switch(es) in anticipation of a user's progress along an identified movement path. Further examples may include providing a reminder to a user of an unfinished action or potentially harmful situation if the user neglects to complete the action, or providing a reminder of an action that has not been taken based on an identified pattern or routine at a certain time that either has been or has not been performed.

Additionally, the system may determine that an anomalous movement path may be occurring based on the learned movement path records, wherein the system may attempt to identify a user taking the anomalous movement path, and based on the identification of the user, the system may provide an alert to the user of the anomalous movement path, or if the user may not be identified, alert a security monitoring service or emergency authorities of the anomalous movement path and/or a non-identified user in the monitored environment.

FIG. 1 illustrates a monitoring system 100 operating in a monitored environment 102 including a plurality of network-connected sensors and network-connected devices 1-13 and 120. The monitored environment 102 may represent a home, an office, a school, a public space, or any monitored environment that may be subject to the monitoring system 100. Network-connected devices 1-13 and 120 in the monitored environment may include, for example, a security system motion sensor 1 and 3, a security system input device 2 and 4, a pyroelectric infrared (PIR) motion sensor 5, a media playback device 6, a security video camera 7, a motion activated light device 8, ultrasonic or PIR motion sensors 9, 10 and 11, a home assistant device 12, an entryway position sensor device 13 and a Access Point (AP) 120. Other network-connected devices that may be present in the monitored environment 102 may further include, for example, but not limited to, network-connected thermostats, other network-connected security devices, network-connected door locking and unlocking devices, network-connected electrical switches, network-connected lighting devices, and network-connected appliances.

All these aforementioned network-connected sensors and devices may be connected directly in an ad hoc fashion to a monitoring system process device 110 via a wireless or wired connections, or may be directly connected to a wireless network maintained by an Access Point (AP) 120 that may be in turn connected to the monitoring system processor device 110. The monitoring system processor device 110 may further be connected to or may have incorporated within, a monitoring system local storage device 112 for storing information collected from the network-connected sensors and devices in the monitored environment 102.

The monitoring system processor device 110 may further be connected to a remote monitoring system 140 and a corresponding remote monitoring system storage device 142 by a communication path 114 with the AP 120, connection to a wide area network (WAN) 130, for example, via the Internet, through a connection path 132 to the remote monitoring system 140. The remote monitoring system 140 may perform all the functions of the monitoring system process device 110 in an offline configuration from data collected by the monitoring system processor device 110.

In an event where a remote security monitoring system 150 may need to be contacted by the monitoring system 100 based on the occurrence or non-occurrence of an event, either the monitoring system processor device 110 via the AP 120 or the remote monitoring system 140, may communicate via the WAN 130 through communication path 134 to the remote security monitoring system 150.

Similarly, in an event where a local area emergency service 160 may need to be contacted by the monitoring system 100 based on the occurrence or non-occurrence of an event, either the monitoring system processor device 110 via the AP 120 or the remote monitoring system 140, may communicate via the WAN 130 through communication path 134 to the remote security monitoring system 150, or directly via communication path 136 to the local area emergency service 160. In the alternative, the remote security monitoring service 150 may communicate via communication path 152 to the local area emergency service 160.

FIG. 1 additionally illustrates a user mobile communication device 170 within the monitored environment 102 of the monitoring system 100. The network-connected sensors and devices may have the ability to detect either a user-provided network device ID name, for example, a Service Set Identifier (SSID), or a hardware-level device ID address, for example, a Media Access Control (MAC) address, in order to compare the detected device ID with a known or registered user associated with the monitored environment 102.

Figure 2:
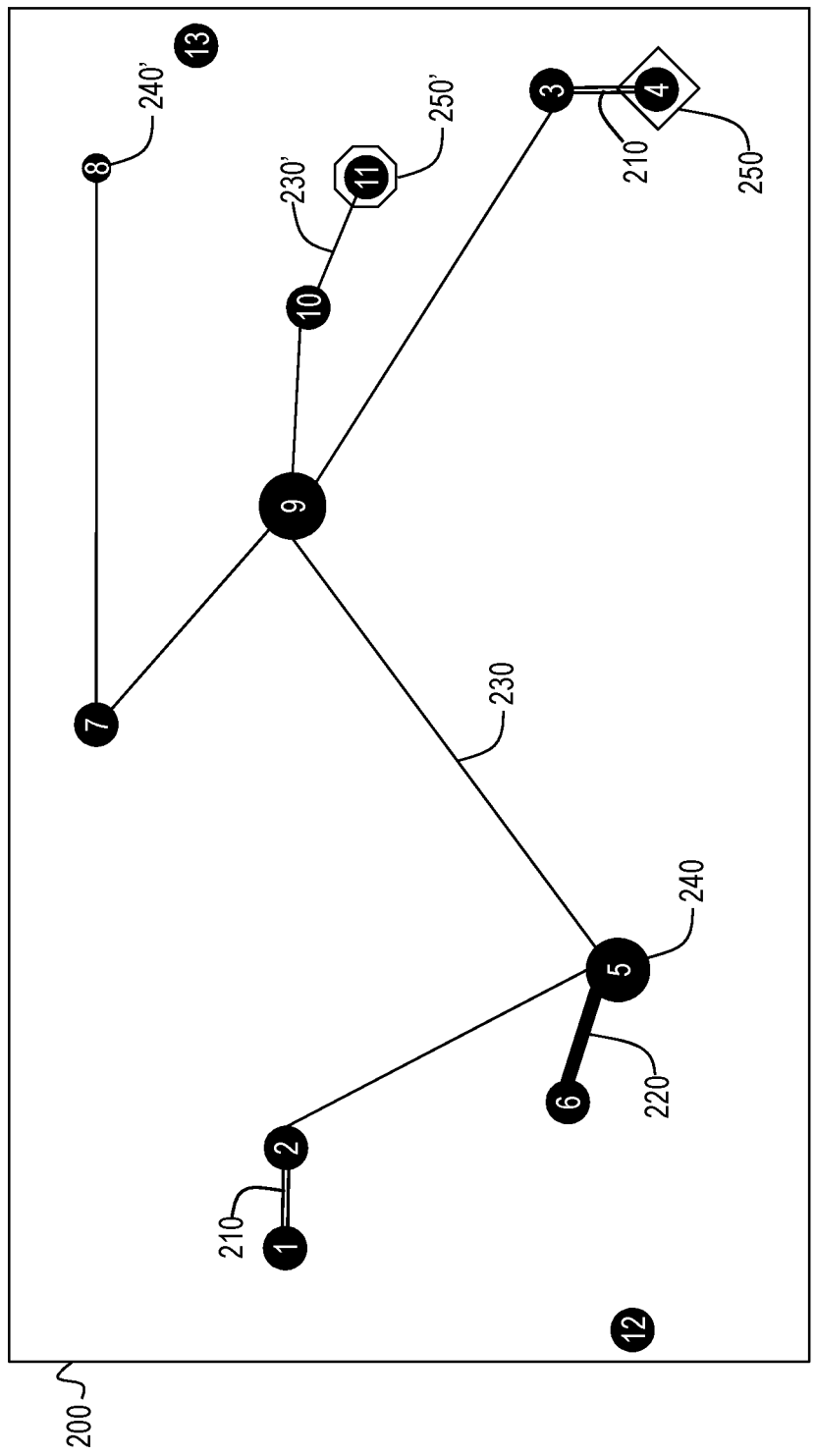
FIG. 2 illustrates a graphical representation of a node graph constructed from the network-connected sensors and network-connected devices in the monitored environment of the monitoring system of FIG. 1.

During operation of the monitoring system 100, the monitoring system processor device 110 may collect signals transmitted from any one of the network-connected sensors and/or devices that sense a user's presence or sense a user's interaction with a network-connected device. From the network-connected sensor or device data collected by the monitoring system processor device 110, a graphical node map may be constructed to identify how and when a user or multiple users traverse and operate devices within the monitored environment 102, as shown in FIG. 2. From the graphical node map and continued machine learning of users' recorded movement paths within the monitored environment 102, routines or common movement paths, whether time-dependent or time-independent, may be learned by the monitoring system 100 such that the monitoring system 100 may perform particular functions within the monitored environment 102 based on the performance or non-performance of a learned movement path.

FIG. 2 illustrates a graphical representation of a node graph 200 constructed from the network of network-connected sensors and network-connected devices 1-13 in the monitored environment 102 of the monitoring system 100 of FIG. 1, where each of the network-connected sensors and devices may be logically represented as node points in the node graph 200.

Learning each movement path through a monitored environment may be conceptualized as a target user traversing between nodes in a network. Each local network-connected sensor in the monitored environment serves as a vertex, and each time a user may be detected at the respective node, information may be gained about its time and place in the monitored environment.

For example, if a user commonly moves from one device to another, in a short period of time, for example, between nodes 1 and 2, and between nodes 3 and 4, a directed edge 210 (illustrated by a double lined linkage), may be added between these two devices or nodes, logically linking them together. By observing these affinities, common sequences may be found using graph data mining and association analysis methods. Additionally, the system may directly visualize the topology of the monitored environment 102 by encoding information such as which devices or nodes are most active, which devices or nodes are movement path starting points (entrances), and which devices or nodes are ending points (exits), as discussed below.

Encoding of the node graph 200 of FIG. 2 to visualize the monitored environment may include providing a weighted linkage 220, for example, between nodes 5 and 6, representing the occurrence of moving from or interacting with two nodes above a minimum interaction threshold value. Another example may include providing a linkage distance indicator, see link 230 between nodes 5 and 9 indicating a longer time, and link 230' between nodes 10 and 11 indicating a shorter time, representing an average time between one node and a next node in movement path.

Another visualization method for the node graph 200 of FIG. 2 may include providing node sizes, for example a large size 240 of node 5 and smaller size 240' of node 8, representing a relative number of detections over a period of time at each respective sensor or device. Another example may include providing node colors, types or shapes, see example starting shape representation 250 at node 4, and an example ending shape representation 250' at node 11, representing a relative occurrence of a node that may be an endpoint versus a starting point, which may ultimately display information about a directionality of a movement path traversed between nodes.

For example, the node graph 200 may show that the monitored environment 102 of FIG. 2 has two active entryways, each with a directed edge 210, for example, a motion sensor or entryway position sensor 1 and 4, for detecting a presence of a user, and a corresponding security input device 2 and 3 for accepting a user entered Personal Identification Number (PIN) ID code or a signal from a Near Field Communication (NFC) device from key fob or a user mobile communication device 170 that may enable or disable an armed state of the security system by means of the security system input device 2 and 3.

In another example, the node graph 200 may show node 11 that may be a routine end point most evenings, where node 11 may be a motion sensor immediately outside of a master bedroom. From the routine end point in the evening, a common movement path each morning may include a movement path triggering event data in sensors 11, 10 and 9 as a user traverses a hallway after existing the master bedroom and traversing a longer distance across a family room into a kitchen where a PIR sensor 5 senses the user's presence. The user may then turn on a network-connected media playback device 6 and tune to a morning news programming station. The monitoring system 100 may collect all the event data from the network-connected sensors and devices and may either generate a new movement path record or compare the event data to an existing stored movement path record.

Figure 3:
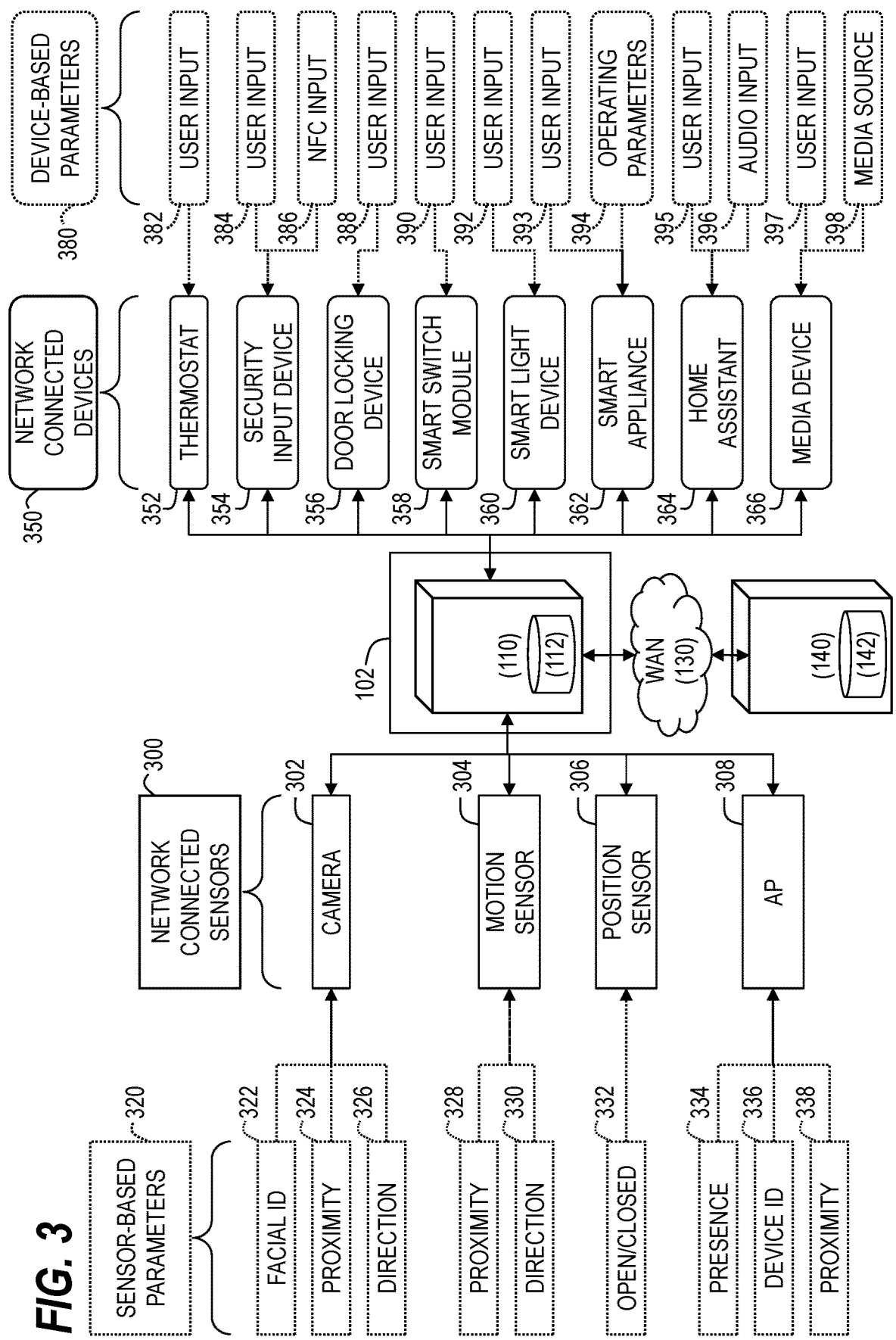
FIG. 3 illustrates sensor sensed parameters from network-connected sensors and device sensed parameters of network-connected devices used in the monitoring system of FIG. 1.

FIG. 3 illustrates sensor-based parameters 320 from network-connected sensors 300 and device-based parameters 380 of network-connected devices 350 used in the monitoring system 100 of FIG. 1.

For the purposes of this application, network-connected sensors 300 may differ from network-connected devices 350 in that the network-connected sensors 300 may not require any direct user interaction as they respond to events triggered by their sensors, whether user-based events or non-user-based events. Whereas, the network-connected devices 350 may generally provide some type of user interface to receive user interaction in the form of user input.

The following is a summary of a representative samples of network-connected sensors and the sensor-based parameters output to the monitoring system processor device 110 in the monitored environment 102. These examples are illustrative and not intended to be limiting, and other sensors and types of sensors may be used without departing from the scope or content of the present disclosure.

One network-connected sensor may include a camera 302 that may provide a facial ID parameter 322 of a user from an image recognition system either within the camera 302 or the monitoring system processing device 110, a proximity parameter 324 that detects when a user may be within the field of view of the camera 302, and/or a direction parameter 326 of the user indicating a direction of travel across the field of view of the camera 302 from the image recognition system either within the camera 302 or the monitoring system processing device 110. The facial ID parameter 322 may be used by the monitoring system processing device 110 to confirm the presence of a registered user or the presence of a nonregistered user within the monitored environment 12.

Another network-connected sensor may include a motion sensor 304. The motion sensor 304 may be a PIR-type motion sensor or an ultrasonic motion sensor, where either type may provide a proximity parameter 328 of a user within the detection range of motion of the motion sensor 304, and/or a relative direction parameter 330 of a user moves across the detection range of motion of the motion sensor 304. The relative direction parameter 330 may also be determined by the monitoring system process and device 110 from more than one network-connected motion sensors 304 based on time information of adjacent motion sensors 304. The proximity primer 328 may additionally indicate a relative distance parameter a user may be in proximity to an active motion sensor 304.

Another network-connected sensor may include a position sensor 306 that may provide an open/closed status parameter 332 indicating the status of an entryway, for example, a hinged entry door, a window, a sliding patio door or garage door. The position sensor 306 may also provide a time duration of an open/closed status parameter 332 indicating how long, for example, an entry door has been left open.

Another network-connected sensor may include an Access Point (AP) 308 that may provide a user presence parameter 334, a device ID parameter 336 and/or a proximity parameter 338 based on the AP's 308 interaction with a user's mobile communication device in the monitored environment 102. The user presence parameter 334 may be based on a device pairing function of the AP 308 with the user's mobile communication device to provide both sensing an identification of the mobile communication device. The proximity parameter 338 may be sensed by the AP 308 based on signal level monitoring of the user's mobile communication device within the range of the AP 308, for example, as a user's mobile communication device moves further away from or closer to the AP 308 in the monitored environment 102.

The following is a summary of a representative sample of network-connected devices 350 and corresponding device-based parameters 380 output to the monitoring system processor device 110 in the monitored environment 102.

One network-connected device may include a network-connected thermostat 352 that may provide a user input parameter 382 when a user interacts with the network-connected thermostat 352. The user input parameter 382 may represent the user setting a temperature at a particular time of day on a particular day of the week that a user inputs into a network-connected thermostat 352.

Another network-connected device may include a security input device 354 that may provide a user input parameter 384 and/or an NFC input parameter 386 when a user interacts with the security input device 354. The user input parameter 384 may represent a pin number that may be entered on a keypad of the security input device 354. The NFC input parameter 386 may also represent when the security input device 354 recognizes in mobile communication device of a user as a security token to either arm or disarm a security system via the security input device 354.

Another network-connected device may include a door locking/unlocking device 356 that may provide a user input parameter 388 when the user interacts with the door locking/unlocking device 356 to either lock or unlock a door. The user input parameter 388 may represent a user interaction of a physical key, a keypad entry, or an NFC device interacting with the door locking/unlocking device 356.

Another network-connected device may include a switch module 358 that may provide a user input parameter 390 when a user interacts with the switch module 358. For example, a user input parameter 390 may represent a user controlling a series of network-connected ceiling lights in a hallway when the user in interacts with the switch module 358 to power the lights on or off.

Another network-connected device may include a lighting device 360 that may provide user input parameter 392 when a user interacts with the lighting a device 360. For example, a user input parameter 392 may represent a user controlling the lighting device 360 through a network-connected wall switch, a command issued on a user mobile communication device, or command issued through a home assistant device.

Another network-connected device may include an appliance 362 that may provide a user input parameter 393 and at least one operating parameter 394 when a user interacts with the appliance 362. For example, a user input parameter 393 may represent an appliance 362 that may be turning on at a certain time of the day and on a certain day of the week.

Another network-connected device may include a home assistant device 364 that may provide a user input parameter 395 and an audio input parameter 396 when a user interacts with the home assistant device 364. The user input parameter 395 may represent a user interacting with a home assistant device 364 to retrieve an email. The audio input parameter 396 may represent an audio query given by the user to the home assistant device 364.

Another network-connected device may include a media playback device 366 that may provide a user input parameter 397 and a media source parameter 398 when a user interacts with the media playback device 366. The user input parameter 397 may represent a user turning the media playback device 366 on at a certain time of day on a certain day of the week. The media source parameter 398 may represent a uniform resource locator (a URL) or a cable television program identifier having information about the particular day, time, and channel the program will be presented on.

FIG. 3 further illustrates monitoring system processor device 110 and monitoring system local storage device 112 within the monitored environment 102 receiving the sensor-based 320 and device-based 380 parameters, wherein those parameters may be communicated via the WAN 130 to the remote monitoring system 140 for storage to and subsequent processing from the remote monitoring systems storage 142.

In addition to each of the above-identified sensor-based 320 and device-based 380 parameters, each of the network-connected sensors 300 and devices 350 may be able to communicate a unique sensor or device identifier (ID) and a time of an event triggered by the sensor or input by a user on a device.

The time parameter recorded at each event triggered by a network-connected sensor or at each input by a user on a network-connected device may include a time of day, a day of the month, a day of the week, a week of the month, a week of the year, and/or a type of day, namely, whether the day may be a holiday or a non-holiday, and/or a weekday or a weekend.

Figure 4:
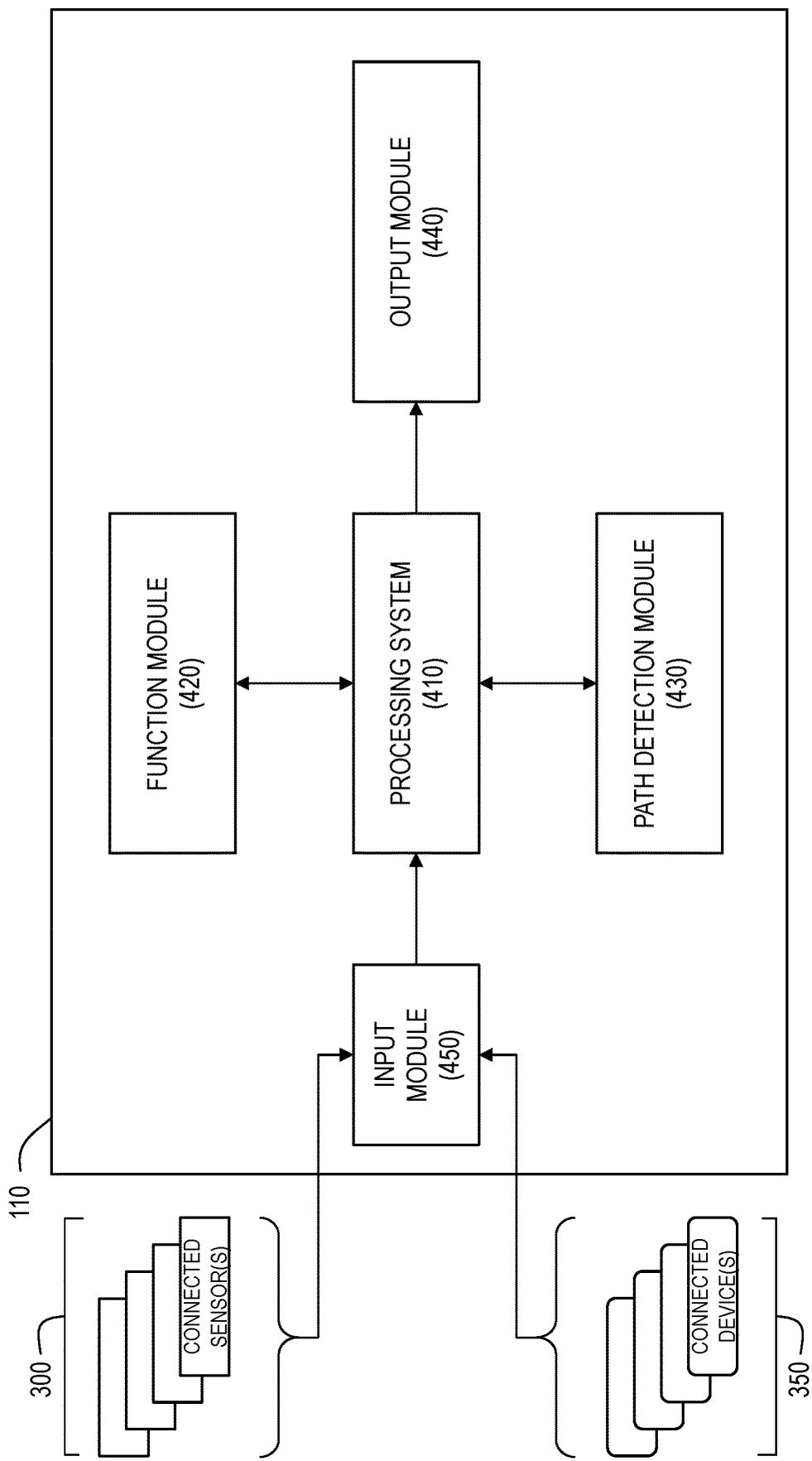
FIG. 4 illustrates a block diagram of a monitoring system processor in the monitored environment of FIG. 1 in communication with a remote monitoring system, where either system may be configured to detect and process one or more forms of sensed triggers or conditions from a network-connected sensor and/or a network-connected device in the monitoring environment of FIG. 1.

FIG. 4 illustrates a block diagram of a monitoring system processor 110 in the monitored environment 102 for communication with a remote monitoring system 140 of FIG. 1, where either monitoring system may be configured to detect and process one or more forms of sensed triggers or conditions from a network-connected sensor and/or a network-connected device in the monitoring environment 102 of FIG. 1.

Function module 420 may be configured to perform some function, such as monitoring a monitored environment 100 in the vicinity of monitoring system processor 110 for one or more sensed trigger signals input by the network-connected sensors 300 and network-connected devices 350 to input module 450 to construct a movement path record. A newly constructed movement path record may then be compared to previously stored movement path records to determine if the newly constructed movement path record may be a non-anomalous or an anomalous movement path.

As an example, function module 420 may monitor the monitored environment for signals received from sensors and/or devices indicating motion, a user ID, user proximity, user direction, a door or window open or closed status, a user communication device presence, a user communication device ID or a user communication device direction of motion, user input into a network-connected appliance, security device, voice activated home assistant device, a Near Field Communication (NFC) input into a corresponding transceiver, a media source that may be presented on media playback device, temperature, humidity, and/or the presence or absence of many other conditions or objects.

Function module 420 may perform other functions from a monitoring function. For instance, function module 420 may perform a status check of another system or may serve to activate another component or system. Function module 420 may perform any number of various functions such as control of a motor, a pump, a medical system, a computing device, etc. Function module 420 may provide input to processing system 410. Further, processing system 410 may be configured to check a status of function module 420.

Movement path detection module 430 may be configured to monitor the vicinity of monitoring system processor 110 for one or more types of movement paths. This movement path may trigger one or more actions to be performed by processing system 410. For example, an identified movement path as detected by movement path detection module 430 may cause processing system 410 to initiate the function module 420 and/or perform a status check of one or more components of monitoring system processor 110, such as function module 420. The movement path detected by movement path detection module 430 may also be unrelated to the functioning of function module 420.

Output module 440 may be used to provide an output that indicates the result of the function module 420. The output may be output via output module 440 in response to a movement path that may be detected by movement path detection module 430.

Movement path detection module 430 may be configured to detect a movement path that coincides with a time at which the user may be likely to traverse a movement path as monitored by the monitoring system processor 110, or the identification of an anticipated movement path based on input received from the network-connected sensors and/or devices.

Output module 440 may be configured to provide an indication of a self-test or status check performed by processing system 410 on the network-connected sensors and network-connected devices. Output module 440 may include components configured to visually output an indication of the status or self-test and/or may include components configured to output audio such that an auditory indication of the status or self-test may be output. For instance, output module 440 may include one or more speakers and/or one or more lights, such as LEDs. Output module 440 may receive data from processing system 410 which triggers sound and/or visual output. In some embodiments, processing system 410 may output spoken messages to be output by output module 440 or processing system 410 may initiate a SMS message or phone call to a communication device of the user of the monitoring system 100.

Figure 5:
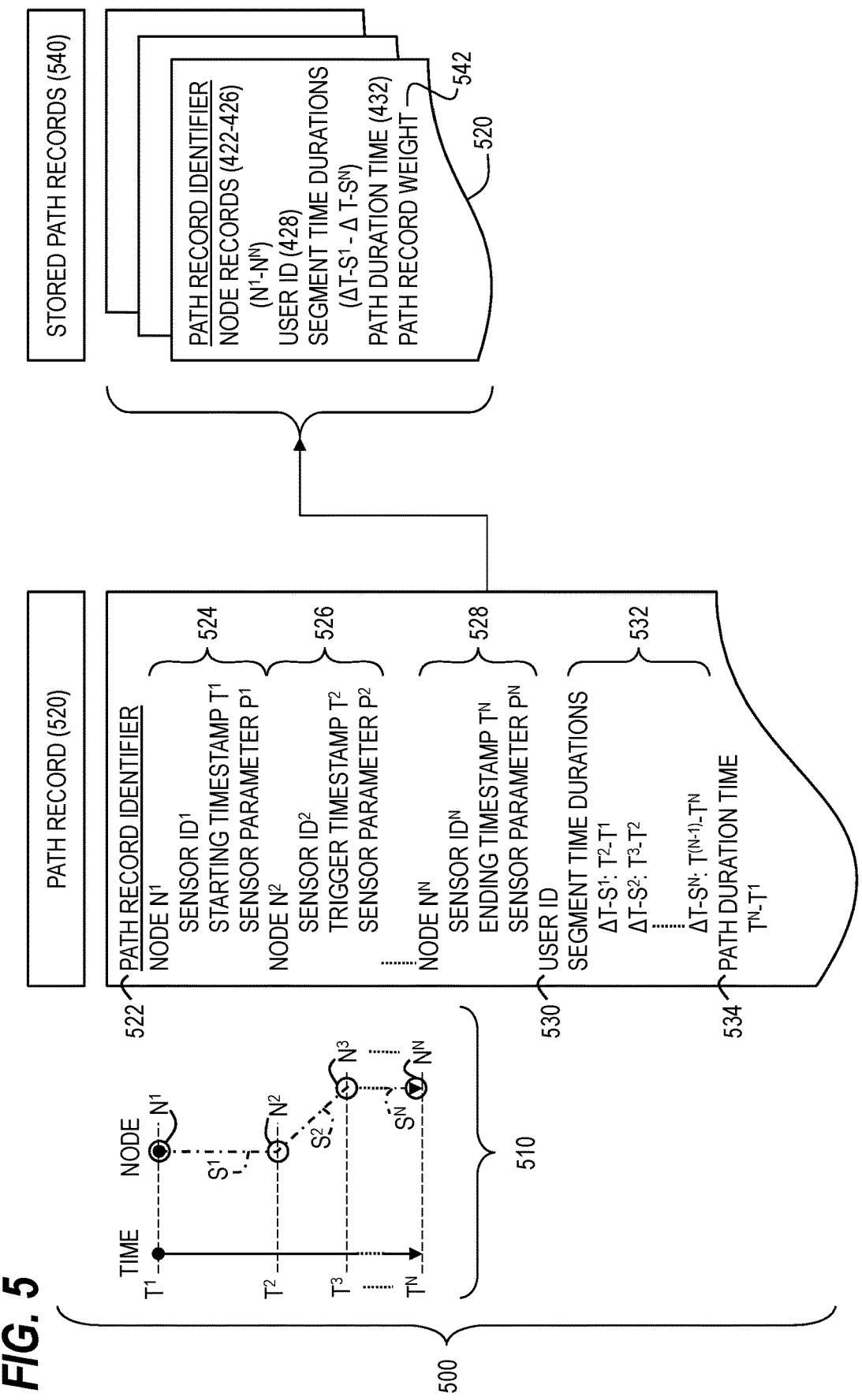
FIG. 5 illustrates a graphical diagram of the contents of a movement path record and stored movement path records corresponding to a time-based node diagram.

FIG. 5 illustrates a graphical diagram 500 of the contents of a movement path record 520 and stored movement path records 540 corresponding to a time-based node diagram 510.

The movement path record 520 may include a unique movement path record identifier 522, a series of movement path node records 524-528, a user ID 530, segment time durations 532 and a total movement path duration time 534.

The unique movement path record identifier 522 identifies the movement path record 520 when it may be stored in a repository of stored movement path records of 540 such that it can be retrieved and have its stored parameters compared against stored parameters of other movement path records by the monitoring system 100.

The first node record 524 of the movement path record 520 may include parameters related to a first event triggered by a network-connected sensor or input by a user on a network-connected device represented by a first node, $N^1$, at a first time, $T^1$, in the time-based node movement path diagram 510. The first node record 524 may include a sensor ID value $ID^1$ of the first node $N^1$, a starting time value $T^1$ associated with when the first event was triggered by the sensor or the first user input was received at the device, and a corresponding sensor parameter $P^1$ from any of the associated sensor-based parameters 320 and/or the device-based parameters 380 of FIG. 3.

A second node of record 526 of the movement path record 520 may include parameters related to a second event triggered by a network-connected sensor or input by a user on a network-connected device represented by a second node, $N^2$, at a second time, $T^2$, in the time-based node movement path diagram 510. The second node record 526 may include a sensor ID value $ID^2$ of the second node $N^2$, a second time value $T^2$ associated with when the second event was triggered by the sensor or second user input was received at the device, and a corresponding sensor parameter $P^2$ from any of the associated sensor-based parameters 320 and/or the device-based parameters 380 of FIG. 3.

Subsequent node records, (not shown), may be collected in a similar manner to the first and second node records as described above.

A final node of record 528 of the movement path record 520 may include parameters related to a final event triggered by a network-connected sensor or input by a user on a network-connected device represented by a last node, $N^N$, at a last time, $T^N$, in the time-based node movement path diagram 510. The final node record 528 may include a sensor ID value $ID^N$ of the final node $N^N$, a final time value $T^N$ associated with when the final event was triggered by the sensor or final user input was received at the device, and a corresponding sensor parameter $P^N$ from any of the associated sensor-based parameters 320 and/or the device-based parameters 380 of FIG. 3.

The user ID 530 may include user ID parameter information detected or input at the network-connected nodes 300 or network-connected devices 350 that includes information either identifying a registered user or identifying an unregistered user with the movement path record 520.

Segment time durations 532 of the movement path record 520 may include parameters related to time durations between adjacent network-connected sensors or network-connected devices on the node movement path represented by difference in time of:

a first segment time duration $\Delta T\text{-}S^1$ between a second time $T^2$ of the second node $N^2$ and a first time $T^1$ of the first node $N^1$;

a second segment time duration $\Delta T\text{-}S^1$ between a third time $T^3$ of a third node $N^3$ and the second time $T^2$ of the second node $N^2$;

and each subsequent segment time duration between adjacent nodes calculated in a similar manner, until a last segment time duration $\Delta T\text{-}S^N$ between a second to last time $T^{N-1}$ of a second to last node $N^{N-1}$ and a movement path end time $T^N$ of the last node $N^N$.

Finally, a total movement path duration time 534 of movement path record 520 may include calculating a difference in time between the first time, $T^1$, of the first node $N^1$, and the movement path end time, $T^N$, of the last node $N^N$.

The movement path record 520, after all its parameters have been stored, the movement path record 520 may be then be stored with the stored movement path records 540 with an additional record field of a movement path record weight 542. The movement path record weight 542 of a particular stored movement path record may be incremented or decremented by a predetermined amount to correspond with a number of times the particular stored movement path record matches (when incremented) or fails to match (when decremented) a new or anomalous movement path record that may be compared against it.

Figure 6:
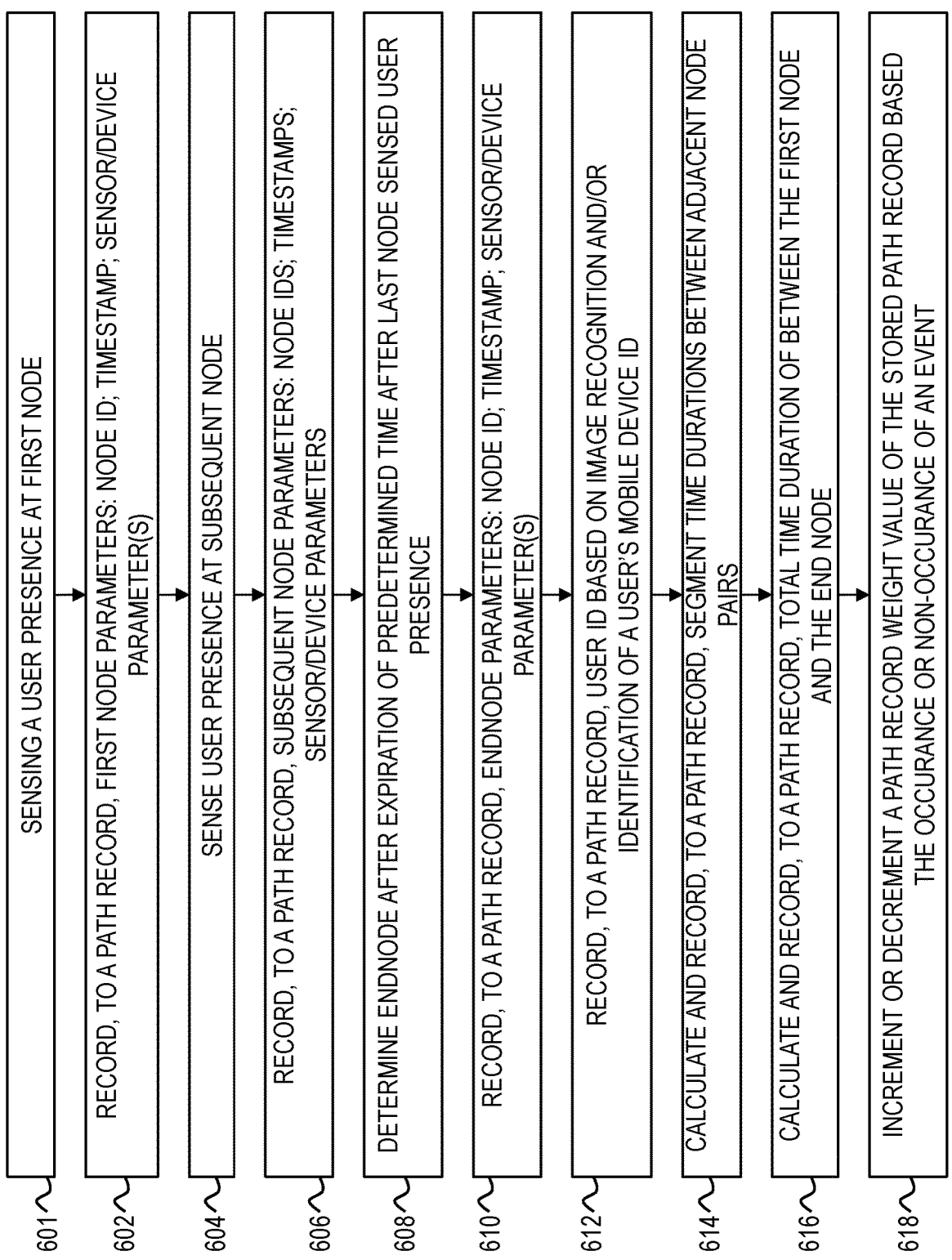
FIG. 6 illustrates a logical flow diagram of a method of creating and storing a movement path record within the monitored environment of FIG. 1.

FIG. 6 illustrates a logical flow diagram of a method 600 of creating and storing a movement path record within the monitored environment of FIG. 1.

The method includes sensing a user presence at a first node 601 by one of an event triggered by a network-connected sensor or user input being received at a network-connected device, and recording, to a movement path record, 602 first node parameters that may include a node ID, a first node time, and/or a network-connected sensor or device parameter(s).

The method further includes sensing 604 a user presence at a subsequent node, other than the first node, by another network-connected sensor or user input been received at another network-connected device, and subsequently recording, to the movement path record, 606 subsequent node parameters that may include a subsequent node ID, a subsequent node time, and/or a network-connected sensor or device parameter(s).

The method further includes determining 608 at an end node from a series of recorded nodes, after an expiration of a predetermined time from a time when the end node sensed a user presence, and subsequently recording, to the movement path record, 610 end node parameters that may include an end node ID, an end node time, and/or a network-connected sensor or device parameter(s).

The method further includes recording, to the movement path record, 612 a user ID based on one of image recognition of the user or the identification of a mobile communication device ID belonging to the user.

The method further includes determining, to the movement path record, 614 segment time durations between adjacent node pairs, and determining, to the movement path record, 616 a total time duration between the time of the first node and the time of the end node.

The method further includes incrementing or decrementing 618 a movement path record weight value stored with the movement path record based on an occurrence or a non-occurrence of an event.

Figure 7:
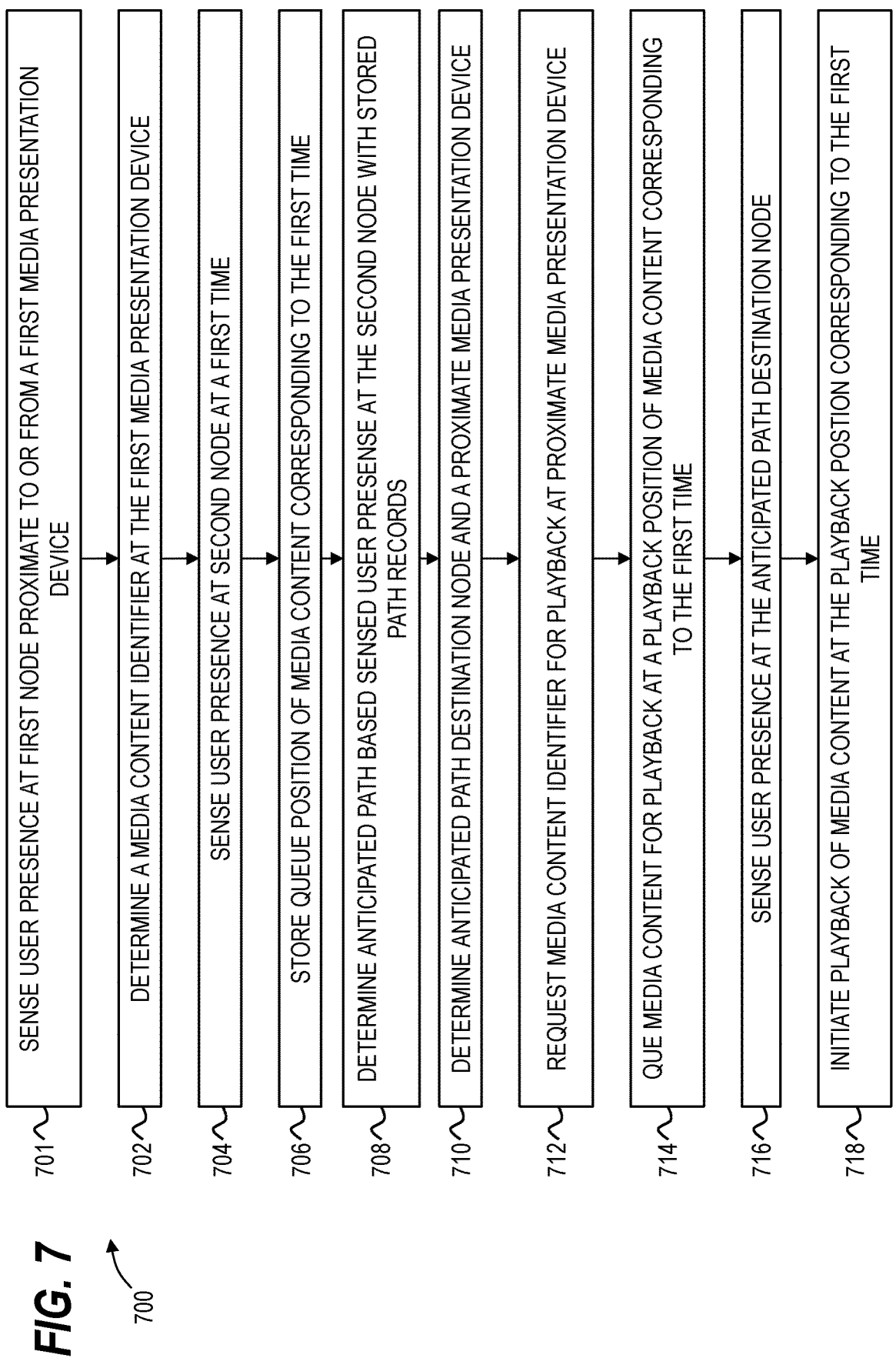
FIG. 7 illustrates a logical flow diagram of a method of a movement path record that may be used to cause media content to follow a user to another media playback device in the monitored environment of FIG. 1.

FIG. 7 illustrates a logical flow diagram of a method 700 of a movement path record that may be used to cause media content to follow a user to another media playback device in the monitored environment of FIG. 1.

The method includes sensing 701 a user presence at a first node proximate to or from a first media presentation device and determining 702 a media content identifier at the first media presentation device.

The method further includes sensing 704 a user presence at a second node at a first time and storing 706 a queue position of the media content corresponding to the first time.

The method further includes determining 708 an anticipated movement path based comparing the sensed user presence at the second node with stored movement path records and determining 710 an anticipated movement path destination node and a media presentation device proximate the anticipated movement path destination node.

The method further includes requesting 712 the media content identifier for playback at the media presentation device proximate the anticipated movement path destination node and queuing 714 the media content for playback at a playback position of media content corresponding to the first time.

The method further includes sensing 716 a user presence at the anticipated movement path destination node, and initiating playback 718 of media content at the playback position corresponding to the first time.

Figure 8:
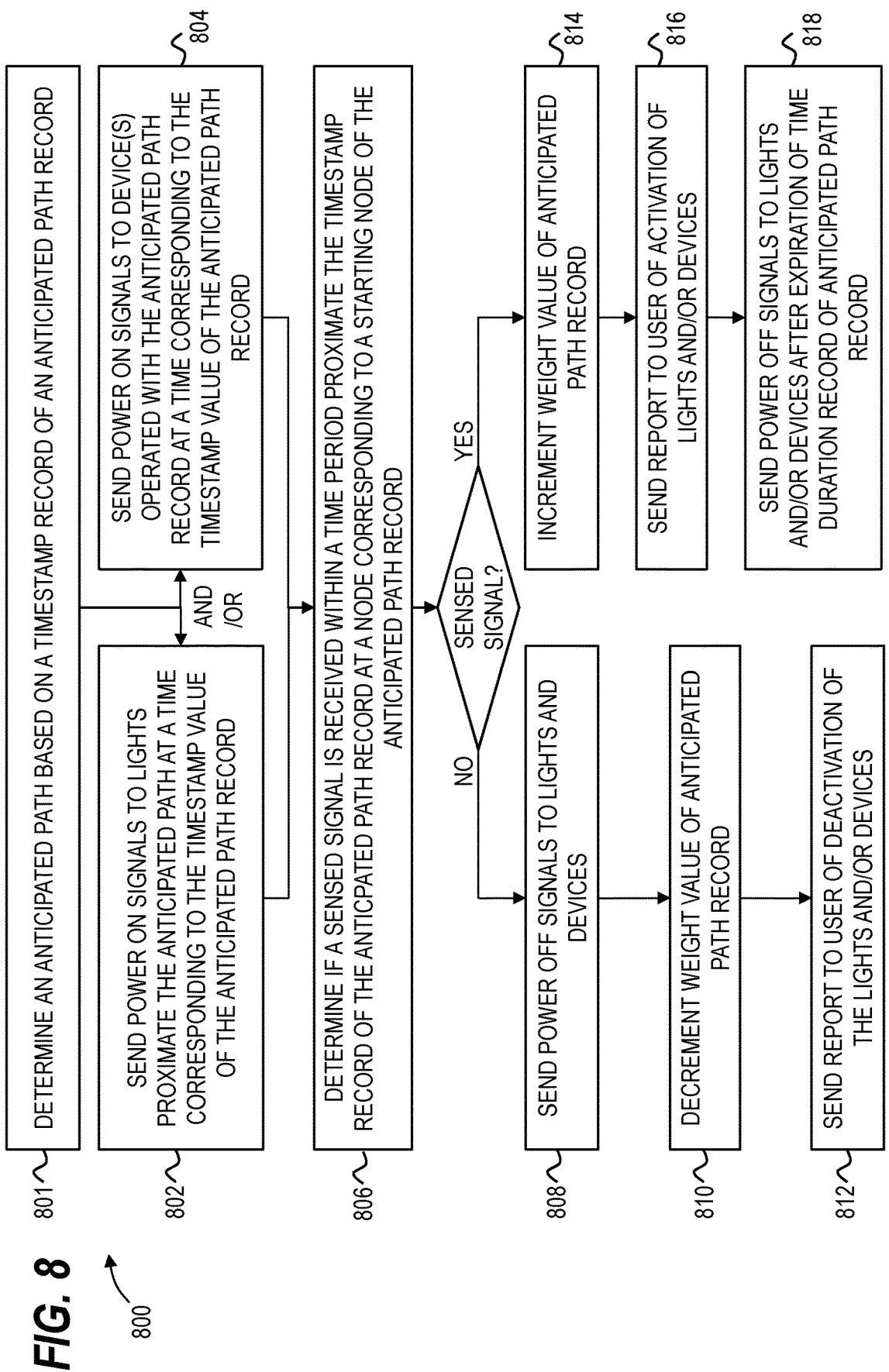
FIG. 8 illustrates a logical flow diagram of a method of anticipating a user routine based on a movement path record to turn on network-connected devices in the monitored environment of FIG. 1.

FIG. 8 illustrates a logical flow diagram of a method 800 of anticipating a user routine based on a movement path record to turn on network-connected devices in the monitored environment of FIG. 1.

The method includes determining 801 an anticipated movement path based on a time record of an anticipated movement path record. The method may send 802 power on signals to the lights proximate the anticipated movement path and/or send 804 power signals to a device operated with the anticipated movement path record, at the time corresponding to the time value of anticipated movement path record.

The method further includes determining 806 if the sensed movement path signal may be received within a time period proximate the time record of the anticipated movement path record at a node corresponding to a starting node of the anticipated movement path record.

The method further includes, if the signal may not be received within the time period proximate the time record of the anticipated movement path record, sending 808 power off signals to the lights and/or device that previously had been powered on, decrementing 810 a weight value of the anticipated movement path record, and sending 812 a report to a user of the deactivation of the lights and/or devices.

The method further includes, if the signal has been received within the time period proximate the time record of the anticipated movement path record, incrementing 814 a weight value of the anticipated movement path record, sending 816 a report to the user of the activation of the lights and/or devices, and sending 818 power off signals to lights and/or devices after expiration of a time duration record of the anticipated movement path record.

Figure 9:
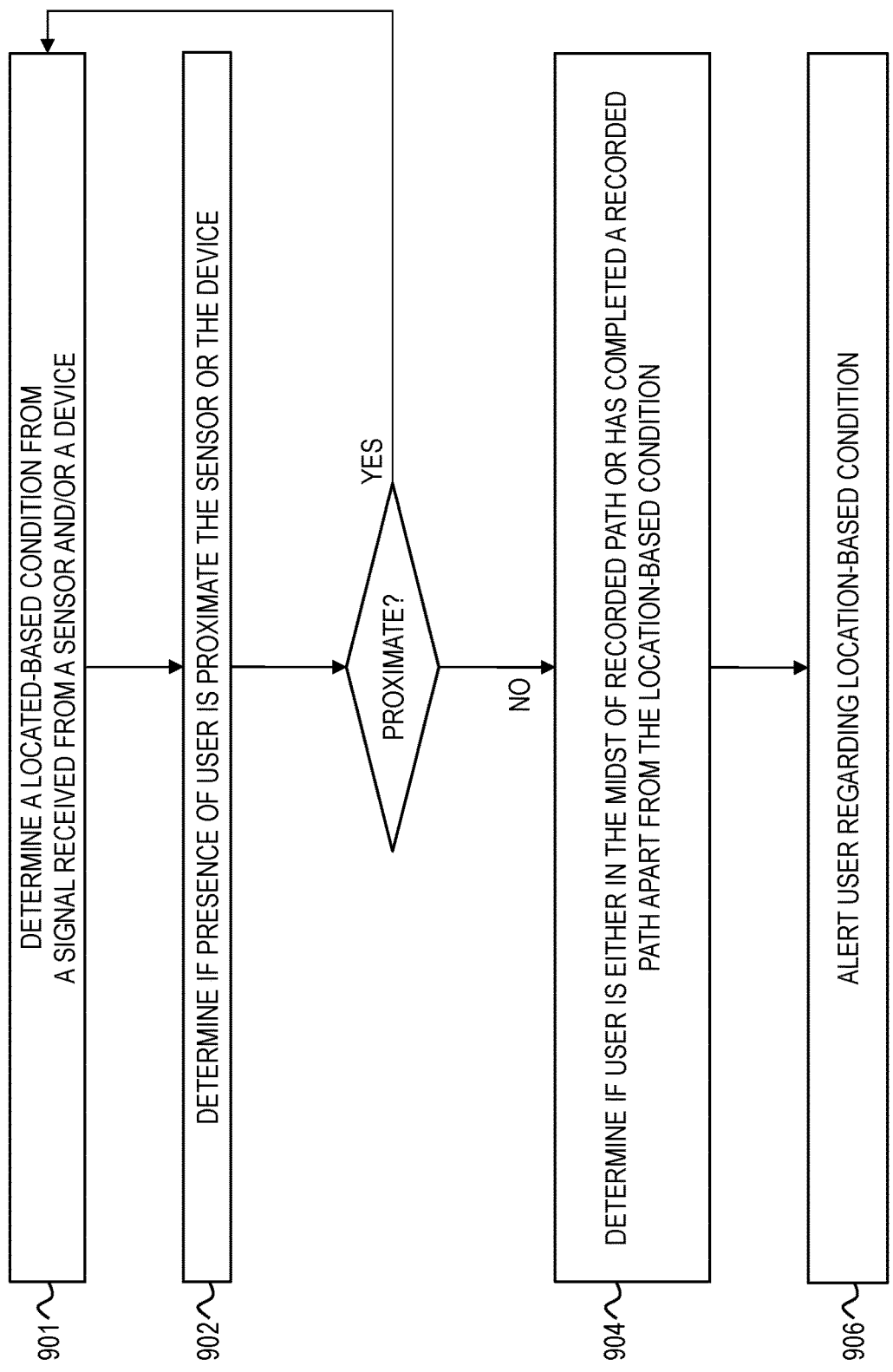
FIG. 9 illustrates a logical flow diagram of a method of reminding a user of a condition in the monitored environment based on determining a movement path record has been completed by the user in the monitored environment of FIG. 1.

FIG. 9 illustrates a logical flow diagram of a method 900 of reminding a user of a condition in the monitored environment based on determining a movement path record has been completed by the user in the monitored environment of FIG. 1.

The method includes determining 901 a location-based condition from a signal received from a sensor and/or a device within the monitored environment 102, and determining 902 if a presence of a user may be proximate the sensor or the device from which the signal was received. For example, a thermal detector may determine that a stove top is still providing heat signature after a time when user activity is typically finished in a cooking area.

The method further includes, if after determination that the user may not be proximate the sensor or the device from which the signal was received, determining 904 if the user may be either in the midst of a recorded movement path or has completed the recorded movement path apart from the location-based condition. For example, when a user has completed a time-based movement path associated with a bedtime routine.

The method further includes alerting 906 the user regarding the location-based condition.

Figure 10:
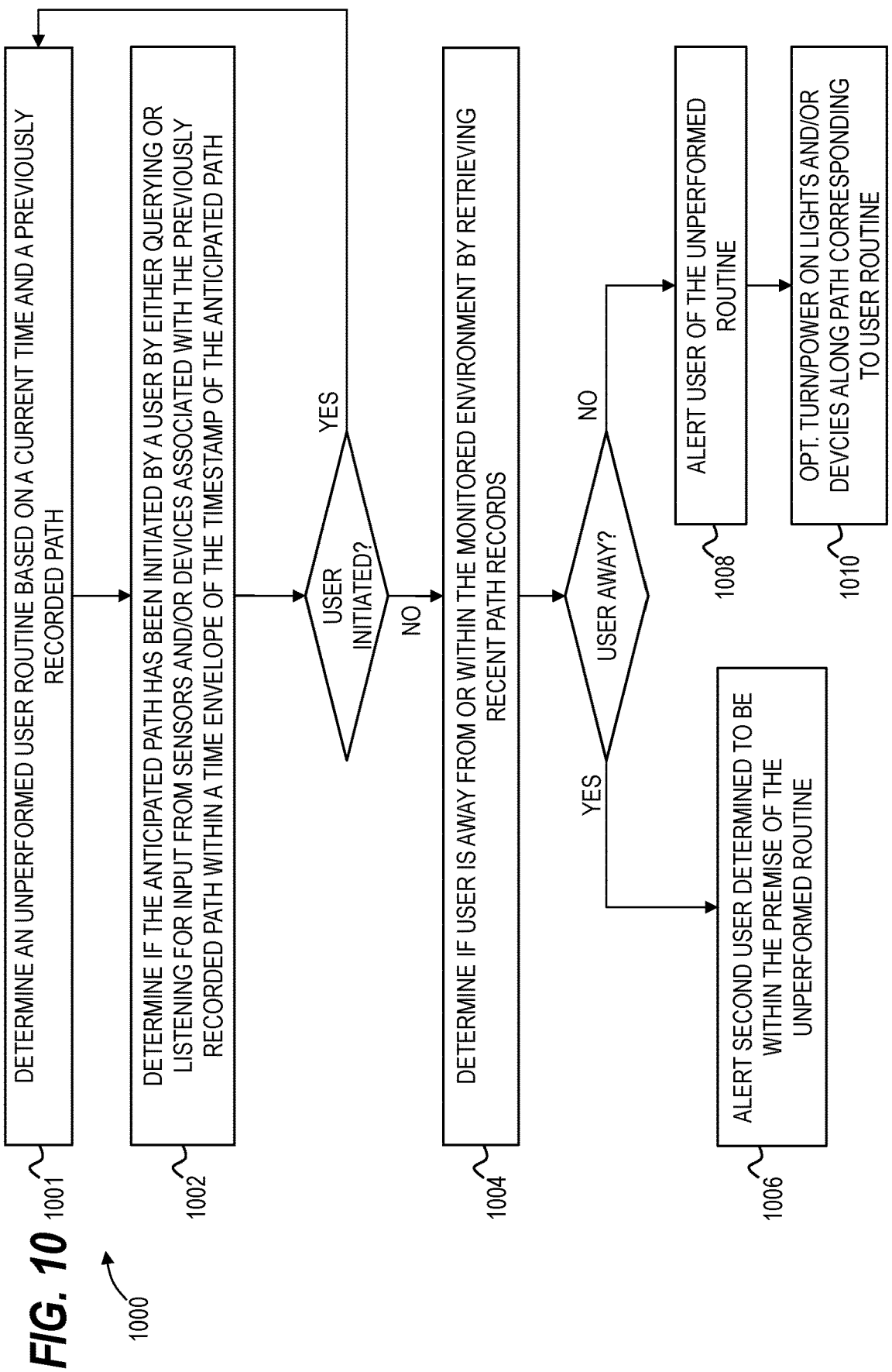
FIG. 10 illustrates a logical flow diagram of a method of reminding a user to an unfinished time-based user routine based on determining a movement path record has not been completed by the user in the monitored environment of FIG. 1.

FIG. 10 illustrates a logical flow diagram of a method 1000 of reminding a user to perform an unfinished time-based user routine based on determining a movement path record has not been completed by the user in the monitored environment of FIG. 1.

The method includes determining 1001 an unperformed user routine based on a current time and a previously recorded movement path and determining 1002 if the anticipated movement path has been initiated by a user by either querying or listening for input from sensors and/or devices associated with the previously recorded movement path within a time envelope of the time of the anticipated movement path. For example, the monitoring system may determine a movement path associated with a weekday and a time specific routine of taking a trashcan out from the monitored premises has not been performed on the basis of a garage door position sensor not being activated by 11:00 PM on a particular night before a trash pickup day.

The method further includes determining 1004 if the user may be away from the monitored environment by retrieving recent movement path records, wherein if the user may be away from the monitored environment, the method further includes alerting 1006 a second user determined to be within the monitored environment of the unperformed routine. If it is determined that the user may be within the monitored environment, the method further includes alerting 1008 the user of the unperformed routine and optionally sending 1010 power on signals to lights and/or devices along the movement path corresponding to the unperformed routine.

Figure 11:
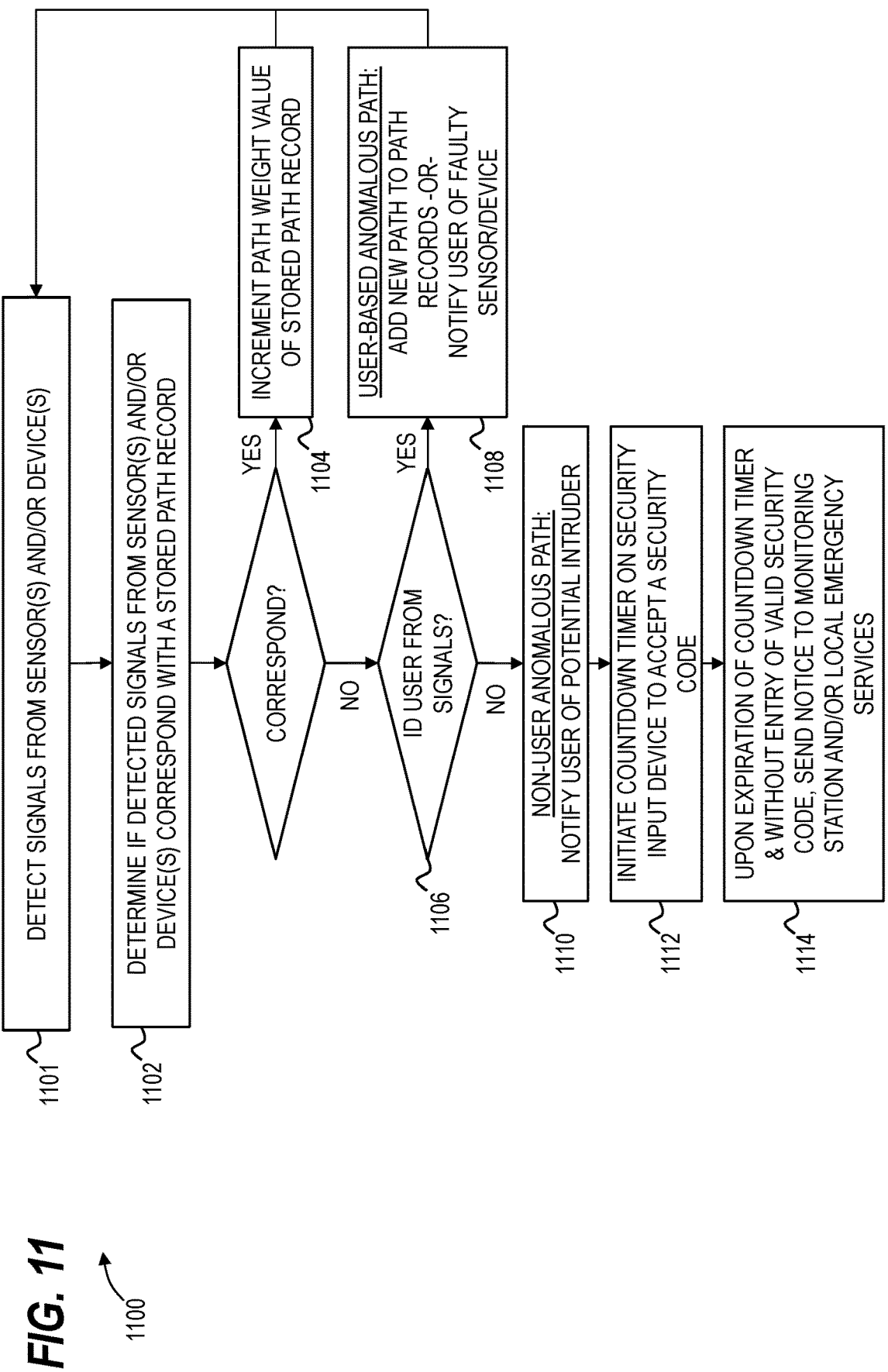
FIG. 11 illustrates a logical flow diagram of a method of detecting an anomalous movement path within the monitored environment of FIG. 1 and alerting the user or a remote service based on determining the status of a user's presence in the monitored environment of FIG. 1.

FIG. 11 illustrates a logical flow diagram of a method 1100 of detecting an anomalous movement path within the monitored environment of FIG. 1 and alerting the user or a remote service based on determining the status of a user's presence in the monitored environment of FIG. 1.

The method includes detecting 1101 signals from network-connected sensors and/or devices and determining 1102 if the detected signals from the network-connected sensors and/or devices correspond with a stored movement path record. If a correspondence with a stored movement path record may be determined, method further increments 1104 a movement path weight value of the stored movement path record.

If no correspondence with a stored movement path record may be determined, the method further includes determining 1106 the presence of a registered user ID from the detected signals of the network-connected sensors and/or network-connected devices. If the presence of a registered user ID may be determined, a user-based anomalous movement path may be added as a new movement path record to the stored movement path records. Optionally, if the presence of a registered user ID may be determined, and the monitoring system 100 determines a fault in the network-connected sensor and/or devices may be causing the user-based anomalous movement path, the method may further include notifying a user of a faulty sensor and/or device.

If the presence of a registered user ID may not be determined, a nonregistered user-based anomalous movement path may be determined, and the method may further notify 1110 a user of a potential intruder. The method may further include initiating 1112 a countdown timer on a security input device to accept a security code, and upon expiration of the countdown timer and without entry of a valid security code, send 1114 a notice to a monitoring station and/or a local emergency service.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it may be stored or used, so that personally identifiable information may be removed. For example, a user's identity may be treated so that no personally identifiable information can be determined to enable locating the user, wherein the user's geographic location may be generalized when location information may be obtained (such as to a city, ZIP code, or state level), so that a particular location of a user cannot be determined. In another example, the user's financial information may be treated so that no personally identifiable financial information may be determined by generalizing or masking financial information when it may be obtained, so that no particular financial information of a user may be determined.

Thus, the user may have control over how information may be collected about the user and used by a system as disclosed herein.

Figure 12:
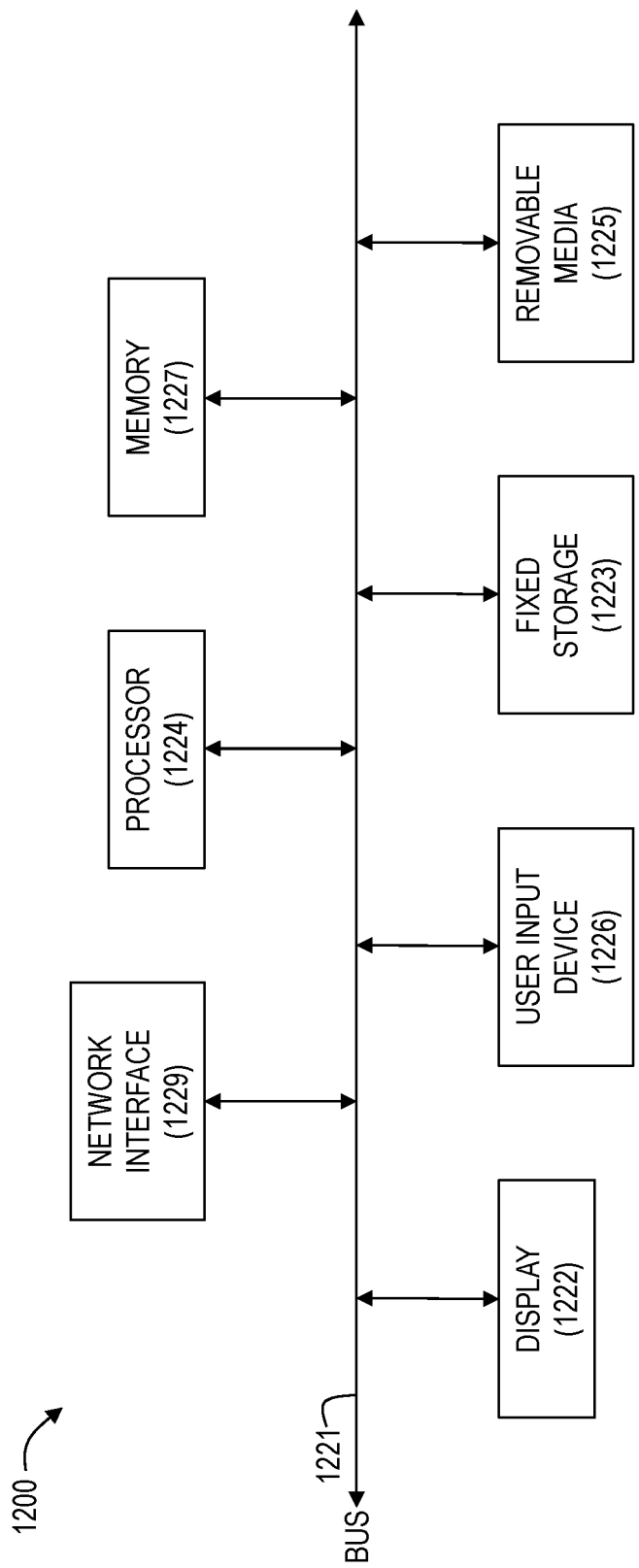
FIG. 12 illustrates a computing device according to an embodiment of the disclosed subject matter.

FIG. 12 illustrates a computing device 1200 according to an embodiment of the disclosed subject matter. Embodiments of the presently disclosed subject matter may be implemented in and used with a variety of component and network architectures. FIG. 12 is an example computing device 1220 suitable for implementing embodiments of the presently disclosed subject matter. The device 1220 may be, for example, a desktop or laptop computer, or a mobile computing device such as a phone, tablet, or the like. The device 1220 may include a bus 1221 which interconnects major components of the computer 1220, such as a central processor 1224, a memory 1227 such as Random Access Memory (RAM), Read Only Memory (ROM), flash RAM, or the like, a user display 1222 such as a display screen, a user input interface 1226, which may include one or more controllers and associated user input devices such as a keyboard, mouse, touch screen, and the like, a fixed storage 1223 such as a hard drive, flash storage, and the like, a removable media component 1225 operative to control and receive an optical disk, flash drive, and the like, and a network interface 1229 operable to communicate with one or more remote devices via a suitable network-connection.

The bus 1221 allows data communication between the central processor 1224 and one or more memory components, which may include RAM, ROM, and other memory, as previously noted. Typically, RAM may be the main memory into which an operating system and application programs are loaded. A ROM or flash memory component can contain, among other code, the Basic Input-Output system (BIOS) which controls basic hardware operation such as the interaction with peripheral components. Applications resident with the computer 1220 are generally stored on and accessed via a computer readable medium, such as a hard disk drive (e.g., fixed storage 1223), an optical drive, floppy disk, or other storage medium.

The fixed storage 1223 may be integral with the computer 1220 or may be separate and accessed through other interfaces. The network interface 1229 may provide a direct connection to a remote server via a wired or wireless connection. The network interface 1229 may provide such connection using any suitable technique and protocol as will be readily understood by one of skill in the art, including digital cellular telephone, Wi-Fi, Bluetooth®, near-field, and the like. For example, the network interface 1229 may allow the computer to communicate with other computers via one or more local, wide-area, or other communication networks, as described in further detail below.

Many other devices or components (not shown) may be connected in a similar manner (e.g., document scanners, digital cameras and so on). Conversely, all the components shown in FIG. 12 need not be present to practice the present disclosure. The components can be interconnected in different ways from that shown. The operation of a computer such as that shown in FIG. 12 is readily known in the art and may not be discussed in detail in this application. Code to implement the present disclosure can be stored in computer-readable storage media such as one or more of the memory 1227, fixed storage 1223, removable media 1225, or on a remote storage location.

Figure 13:
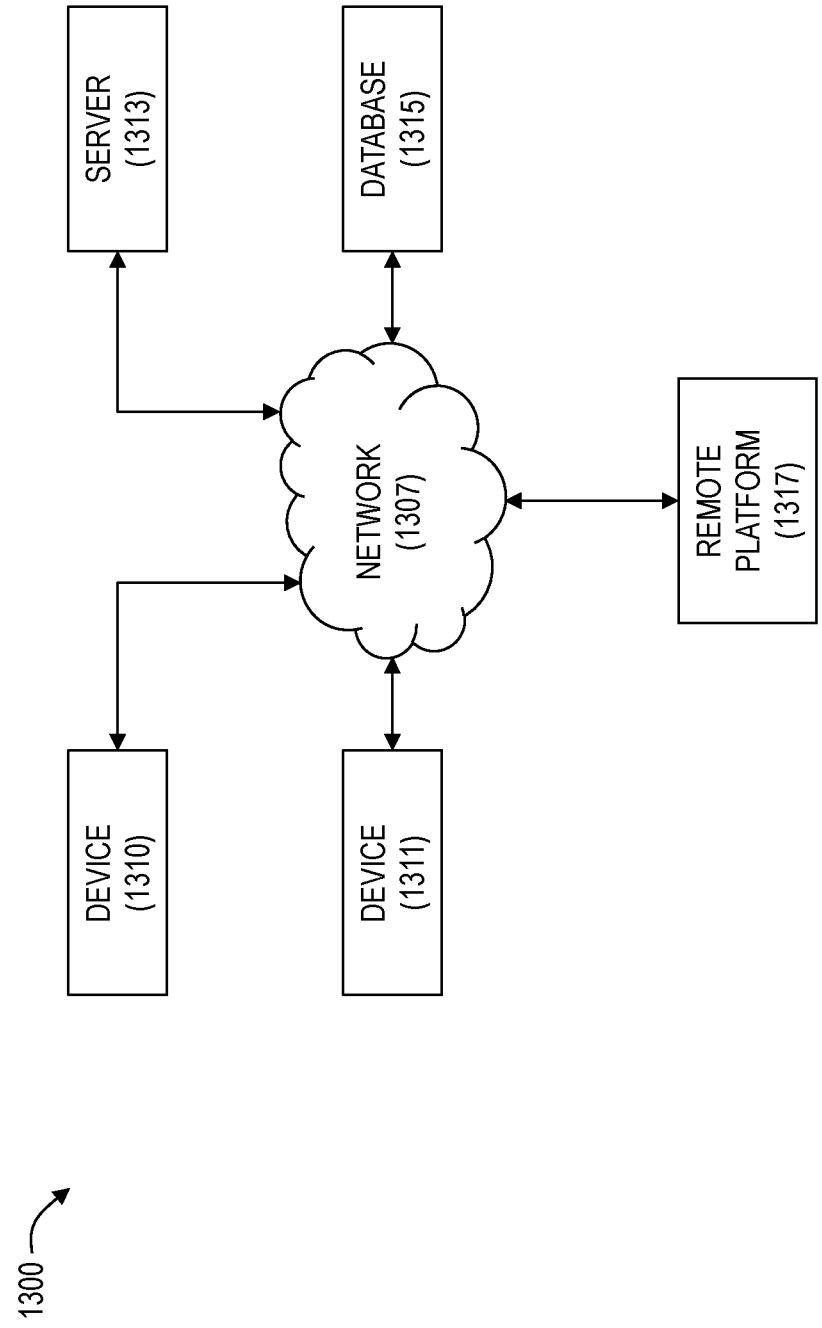
FIG. 13 illustrates a network configuration according to an embodiment of the disclosed subject matter.

FIG. 13 illustrates a network configuration 1300 according to an embodiment of the disclosed subject matter. One or more devices 1310, 1311, such as local computers, phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 1313 and/or databases 1315. The remote devices may be directly accessible by the devices 1310, 1311, or one or more other devices may provide intermediary access such as where a server 1313 provides access to resources stored in a database 1315. The devices 1310, 1311 also may access remote platforms 1317 or services provided by remote platforms 1317 such as cloud computing arrangements and services. The remote platform 1317 may include one or more servers 1313 and/or databases 1315.

Figure 14:
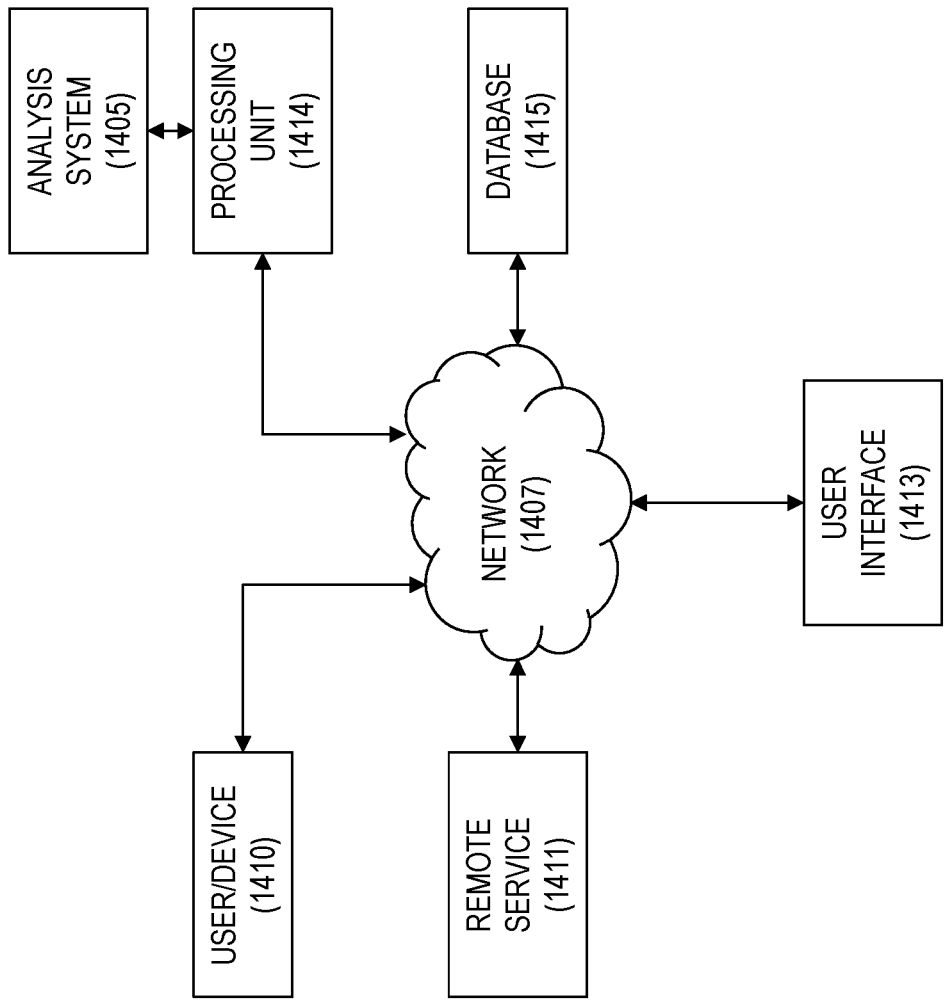
FIG. 14 illustrates an example network and system configuration according to an embodiment of the disclosed subject matter.

FIG. 14 illustrates an example network and system configuration 1400 according to an embodiment of the disclosed subject matter. One or more devices or systems 1410, 1411, such as remote services or service providers 1411, user devices 1410 such as local computers, phones, tablet computing devices, and the like, may connect to other devices via one or more networks 1407. The network may be a local network, wide-area network, the Internet, or any other suitable communication network or networks, and may be implemented on any suitable platform including wired and/or wireless networks. The devices 1410, 1411 may communicate with one or more remote computer systems, such as processing units 1414, databases 1415, and user interface systems 1413. In some cases, the devices 1410, 1411 may communicate with a user-facing interface system 1413, which may provide access to one or more other systems such as a database 1415, a processing unit 1414, or the like. For example, the user interface 1413 may be a user-accessible web page that provides data from one or more other computer systems. The user interface 1413 may provide different interfaces to different clients, such as where a human-readable web page is provided to a web browser client on a user device 1410, and a computer-readable API or other interface is provided to a remote service client 1411.

The user interface 1413, database 1415, and/or processing units 1414 may be part of an integral system or may include multiple computer systems communicating via a private network, the Internet, or any other suitable network. One or more processing units 1414 may be, for example, part of a distributed system such as a cloud-based computing system, search engine, content delivery system, or the like, which may also include or communicate with a database 1415 and/or user interface 1413. In some arrangements, an analysis system 1405 may provide back-end processing, such as where stored or acquired data is pre-processed by the analysis system 1405 before delivery to the processing unit 1414, database 1415, and/or user interface 1413. For example, a machine learning system 1405 may provide various prediction models, data analysis, or the like to one or more other systems 1413, 1414, 1415.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk, or any other device capable of storing electronic information. The memory may store instructions adapted to be executed by the processor to perform the techniques according to embodiments of the disclosed subject matter.

The present disclosure provides various systems, techniques, and arrangements, including but not limited to the following.

A computer-implemented method for detecting a movement path in a monitored environment includes generating a first movement path record by collecting first node information for each of a first series of nodes, each first node information including at least one of a sensor ID or a device ID, and a trigger time, and determining a starting node and an ending node from the first series of nodes based on respective trigger times, and determining a first movement path total duration time from a difference between a time of the ending node and a time of the starting node of the first series of nodes. The method further includes storing the first movement path record with a first movement path record weight value.

The method further includes generating a second movement path record by collecting second node information for each of a second series of nodes, each second node information including at least one of a sensor ID or a device ID, and a trigger time, and determining a starting node and an ending node from the second series of nodes based on respective trigger times, and determining a second movement path total duration time from a difference between a time of the ending node and a time of the starting node of the second series of nodes.

The method further includes comparing the second movement path record with the first movement path record by comparing at least one of the first node information for each of the first series of nodes and the second node information for each of the second series of nodes, and the first movement path total duration time and the second movement path total duration time.

The method further includes determining a similarity value between the second movement path record and the first movement path record and detecting a movement path based on the determined similarity value between the second movement path record and the first movement path record.

The first node information for each of the first series of nodes and the second node information for each of the second series of nodes further includes at least one sensor parameter value, wherein the at least one sensor parameter value that may be from at least one selected from the group consisting of: one of a user ID value, a proximity value or a direction value as determined by a network-connected camera sensor; one of a proximity value or a direction value as determined by a network-connected motion sensor; one of an open value or closed value as determined by a network-connected position sensor; and one of a user presence value, a user device ID or a user proximity value as determined by a network-connected Access Point (AP).

The first node information for each of the first series of nodes and the second node information for each of the second series of nodes further includes at least one device parameter value, wherein the at least one device parameter value that may be from at least one selected from the group consisting of: a user input value to a network-connected thermostat device; one of a user input value or a Near Field Communication (NFC) value to a network-connected security input device; a user input value to a network-connected door locking device; a user input value to a network-connected switch device; a user input value to a network-connected lighting element device; one of a user input value or an operating parameter value to a network-connected appliance device; one of a user input value or an audio input to a network-connected home assistance device; or one of a user input value or a media source value to a network-connected media playback device.

Where generating the first movement path record and the second movement path record further includes collecting a first user ID determined by a first user ID determining node of the first series of nodes, and collecting a second user ID determined by a second user ID determining node of the second series of nodes.

At least one of the first user ID and the second user ID is determined by at least one of a network-connected camera providing a recognized face scan corresponding to at least one of the first user ID and the second user ID, and a network-connected Access Point (AP) providing a recognized mobile communication device ID corresponding to at least one of the first user ID and the second user ID.

Where comparing the second movement path record with the first movement path record further includes determining a similarity between values of the first user ID and the second user ID.

Where generating the first movement path record and the second movement path record further includes determining time durations between pairs of adjacent nodes in the first series of nodes; and determining time durations between pairs of adjacent nodes in the second series of nodes.

Where comparing the second movement path record with the first movement path record further comprises determining a similarity between values of the time durations between pairs of adjacent nodes in the first series of nodes and the second series of nodes.

The method further includes generating a first movement path node graph of the first movement path record by graphically displaying the first series of nodes in a graphical format, the first movement path node graph including a graphical representation of one of a corresponding sensor ID or device ID of the first series of nodes, and graphical linkages between nodes of the first series of nodes corresponding to sequential times in the first movement path record.

Where the first movement path node graph further includes the graphical nodes further representing a graphical node size corresponding to a frequency of one of sensor or device triggers of a corresponding node of the first series of nodes of the first movement path, and a graphical node direction indicator corresponding to a relative occurrence of a corresponding node that may be one of a starting point or an endpoint of the first series of nodes of the first movement path. The graphical linkages further representing a graphical linkage weight corresponding to a frequency of occurrences between corresponding nodes of the first series of nodes of the first movement path, and a graphical linkage distance corresponding to a time duration between corresponding nodes of the first series of nodes of the first movement path.

Where determining the similarity of values of the second movement path record and the first movement path record further includes performing unsupervised machine learning by at least one of graph data mining and association analysis on the first and second movement path records, wherein the unsupervised machine learning is performed remotely and off-line from the monitored environment.

The method further includes at a first network-connected sensor or device, sensing a user presence proximate a first media presentation device and determining a media content identifier of media content that may be played back on the first media presentation device, at a second network-connected sensor or device, sensing the user presence at a first time and storing a queue position of the media content that may be played back on the first media presentation device corresponding to the first time, determining an anticipated movement path from a plurality of stored movement path records based on a similarity of values between one of the stored movement path records and the sensed user presence at the second network-connected sensor or device, determining a destination of the anticipated movement path and a second media presentation device proximate the destination, requesting the media content identifier of the media content and queue the media content at the queue position for playback at the second media presentation device, and at a third network-connected sensor or device proximate the destination of the anticipated movement path, sensing the user presence and subsequently initiating playback of the media content at the queue position on the second media presentation device.

The method further includes determining an anticipated movement path commencing at a first time from a plurality of stored movement path records based on a similarity of a time value between one stored movement path record of the plurality of stored movement path records, and sending a power on signal to at least one of a network-connected lighting device or a network-connected appliance at the first time based on a time value of the one stored movement path record.

The method further includes determining whether a sensed signal is received from at least one of a network-connected sensor or network-connected device within a time period proximate a time value of the one stored movement path record, and one of incrementing a weight value of the one stored movement path record when the sensed signal is received within the time period, or decrementing the weight value of the one stored movement path record when the sensed signal may not be received within the time period and sending a power off signal to the at least one of the network-connected lighting device or the network-connected appliance.

The method further includes determining a location-based condition from a signal received from at least one of a network-connected sensor or a network-connected device, determining a presence of a user may not be proximate the at least one of the network-connected sensor or the network-connected device, determining the user is one of currently on or has completed a movement path corresponding to a stored movement path record, and alerting the user of the location-based condition based on determining the user is one of currently on or has completed the movement path corresponding to the stored movement path.

The method further includes determining a user routine associated with an anticipated movement path commencing at a first time from a plurality of stored movement path records based on a similarity of a time value between one stored movement path record of the plurality of stored movement path records, and determining the anticipated movement path has not been commenced proximate the first time based on a determination of an absence of a signal received from at least one of a network-connected sensor or network-connected device corresponding to the anticipated movement path of the stored movement path record.

The method further includes determining a user-status with respect to a user presence in the monitored environment, and alerting a second user in the monitoring environment to a non-performance of the user routine based on the user-status that may be determined to be apart from the monitored environment.

The method further includes determining a user-status with respect to a user presence in the monitored environment and alerting a user to a non-performance of the user routine based on the user-status that may be determined to be within the monitored environment.

The method further includes determining an existence of the similarity value between the second movement path record and the first movement path record and incrementing the first movement path record weight value.

The method further includes determining a non-existence of the similarity value between the second movement path record and the first movement path record, determining a recognized user ID value associated with the second movement path record, storing the second movement path record with a second movement path record weight value.

The method further includes determining a non-existence of the similarity values between the second movement path record and the first movement path record, determining an un-recognized user ID value associated with the second movement path record, initiating a countdown timer on a security input device at accept a predetermined security code, and sending, upon expiration of the countdown timer and without entry of the predetermined security code at the security input device, an alert message to one of a monitoring station or a local emergency service.

A system for detecting a movement path in a monitored environment, the system including a memory configured to store processor instructions, and a processor in communication with the memory, the processor configured to execute the processor instructions to perform generating a first movement path record by collecting first node information for each of a first series of nodes, each first node information including at least one of a sensor ID or a device ID, and a trigger time, and determining a starting node and an ending node from the first series of nodes based on respective trigger times, and determining a first movement path total duration time from a difference between a time of the ending node and a time of the starting node of the first series of nodes. The processor configured to execute the processor instructions to further perform storing the first movement path record with a first movement path record weight value.

The processor configured to execute the processor instructions to further perform generating a second movement path record by collecting second node information for each of a second series of nodes, each second node information including at least one of a sensor ID or a device ID, and a trigger time, and determining a starting node and an ending node from the second series of nodes based on respective trigger times, and determining a second movement path total duration time from a difference between a time of the ending node and a time of the starting node of the second series of nodes.

The processor configured to execute the processor instructions to further perform comparing the second movement path record with the first movement path record by comparing at least one of the first node information for each of the first series of nodes and the second node information for each of the second series of nodes, and the first movement path total duration time and the second movement path total duration time.

The processor configured to execute the processor instructions to further perform determining a similarity value between the second movement path record and the first movement path record, and detecting a movement path based on the determined similarity value between the second movement path record and the first movement path record.

A non-transitory computer-readable medium storing computer code for controlling a processor to cause the processor to perform a method, the computer code including computer instructions to cause the processor to: detect a movement path in a monitored environment includes generating a first movement path record by collecting first node information for each of a first series of nodes, each first node information including at least one of a sensor ID or a device ID, and a trigger time, and determining a starting node and an ending node from the first series of nodes based on respective trigger times, and determining a first movement path total duration time from a difference between a time of the ending node and a time of the starting node of the first series of nodes. The computer code including computer instructions to further cause the processor to store the first movement path record with a first movement path record weight value.

The computer code including computer instructions to further cause the processor to generate a second movement path record by collecting second node information for each of a second series of nodes, each second node information including at least one of a sensor ID or a device ID, and a trigger time, and determining a starting node and an ending node from the second series of nodes based on respective trigger times, and determining a second movement path total duration time from a difference between a time of the ending node and a time of the starting node of the second series of nodes.

The computer code including computer instructions to further cause the processor to compare the second movement path record with the first movement path record by comparing at least one of the first node information for each of the first series of nodes and the second node information for each of the second series of nodes, and the first movement path total duration time and the second movement path total duration time.

The computer code including computer instructions to further cause the processor to determine a similarity value between the second movement path record and the first movement path record, and detecting a movement path based on the determined similarity value between the second movement path record and the first movement path record.

A means for detecting a movement path in a monitored environment, including means for generating a first movement path record by collecting first node information for each of a first series of nodes, each first node information including at least one of a sensor ID or a device ID, and a trigger time, and determining a starting node and an ending node from the first series of nodes based on respective trigger times, and determining a first movement path total duration time from a difference between a time of the ending node and a time of the starting node of the first series of nodes. The means for detecting further includes means for storing the first movement path record with a first movement path record weight value.

The means for detecting further includes means for generating a second movement path record by collecting second node information for each of a second series of nodes, each second node information including at least one of a sensor ID or a device ID, and a trigger time, and determining a starting node and an ending node from the second series of nodes based on respective trigger times, and determining a second movement path total duration time from a difference between a time of the ending node and a time of the starting node of the second series of nodes.

The means for detecting further includes means for comparing the second movement path record with the first movement path record by comparing at least one of the first node information for each of the first series of nodes and the second node information for each of the second series of nodes, and the first movement path total duration time and the second movement path total duration time.

The means for detecting further includes means for determining a similarity value between the second movement path record and the first movement path record, detecting a movement path based on the determined similarity value between the second movement path record and the first movement path record.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method for detecting a movement path in a monitored environment, the method comprising:
   generating a first movement path record by:
      collecting first node information for each of a first series of nodes, each first node information including at least one of a sensor ID or a device ID, and a trigger time,
      determining a starting node and an ending node from the first series of nodes based on respective trigger times, and determining a first movement path total duration time from a difference between a time of the ending node and a time of the starting node of the first series of nodes;

storing the first movement path record with a first movement path record weight value;

generating a second movement path record by:
  collecting second node information for each of a second series of nodes, each second node information including at least one of a sensor ID or a device ID, and a trigger time,
  determining a starting node and an ending node from the second series of nodes based on respective trigger times, and
  determining a second movement path total duration time from a difference between a time of the ending node and a time of the starting node of the second series of nodes;

comparing the second movement path record with the first movement path record by comparing at least one of:
  the first node information for each of the first series of nodes and the second node information for each of the second series of nodes, and
  the first movement path total duration time and the second movement path total duration time;

determining a similarity value based on comparing the second movement path record and the first movement path record by performing unsupervised machine learning by at least one of graph data mining and association analysis on the first and second movement path records, wherein the unsupervised machine learning is performed remotely and off-line from the monitored environment; and detecting a movement path in the monitored environment based on the determined similarity value.

2. A computer-implemented method for detecting a movement path in a monitored environment, the method comprising:

generating a first movement path record by:
  collecting first node information for each of a first series of nodes, each first node information including at least one of a sensor ID or a device ID, and a trigger time,
  determining a starting node and an ending node from the first series of nodes based on respective trigger times, and
  determining a first movement path total duration time from a difference between a time of the ending node and a time of the starting node of the first series of nodes;

storing the first movement path record with a first movement path record weight value;

generating a second movement path record by:
  collecting second node information for each of a second series of nodes, each second node information including at least one of a sensor ID or a device ID, and a trigger time,
  determining a starting node and an ending node from the second series of nodes based on respective trigger times, and
  determining a second movement path total duration time from a difference between a time of the ending node and a time of the starting node of the second series of nodes;

comparing the second movement path record with the first movement path record by comparing at least one of:
  the first node information for each of the first series of nodes and the second node information for each of the second series of nodes, and
  the first movement path total duration time and the second movement path total duration time;

determining a similarity value based on comparing the second movement path record and the first movement path record;

detecting a movement path in the monitored environment based on the determined similarity value;

at a first network-connected sensor or device, sensing a user presence proximate a first media presentation device and determining a media content identifier of media content that may be played back on the first media presentation device;

at a second network-connected sensor or device, sensing the user presence at a first time and storing a queue position of the media content that may be played back on the first media presentation device corresponding to the first time;

determining an anticipated movement path from a plurality of stored movement path records based on a similarity of values between one of the stored movement path records and the sensed user presence at the second network-connected sensor or device;

determining a destination of the anticipated movement path and a second media presentation device proximate the destination;

requesting the media content identifier of the media content and queue the media content at the queue position for playback at the second media presentation device; and at a third network-connected sensor or device proximate the destination of the anticipated movement path, sensing the user presence and subsequently initiating playback of the media content at the queue position on the second media presentation device.

3. A computer-implemented method for detecting a movement path in a monitored environment, the method comprising:

generating a first movement path record by:
  collecting first node information for each of a first series of nodes, each first node information including at least one of a sensor ID or a device ID, and a trigger time,
  determining a starting node and an ending node from the first series of nodes based on respective trigger times, and
  determining a first movement path total duration time from a difference between a time of the ending node and a time of the starting node of the first series of nodes;

storing the first movement path record with a first movement path record weight value;

generating a second movement path record by:
  collecting second node information for each of a second series of nodes, each second node information including at least one of a sensor ID or a device ID, and a trigger time,
  determining a starting node and an ending node from the second series of nodes based on respective trigger times, and
  determining a second movement path total duration time from a difference between a time of the ending node and a time of the starting node of the second series of nodes;

comparing the second movement path record with the first movement path record by comparing at least one of:
            the first node information for each of the first series of nodes and the second node information for each of the second series of nodes, and
            the first movement path total duration time and the second movement path total duration time;
        determining a similarity value based on comparing the second movement path record and the first movement path record;
        detecting and recording a movement path in the monitored environment based on the determined similarity value;
        determining whether a sensed signal is received within a time period proximate a time value of the movement path record;
        performing one of
            incrementing a weight value of the movement path record when the sensed signal is received within the time period, or
            decrementing the weight value of the movement path record when the sensed signal is not received within the time period; and
        sending a power off signal to at least one of a network-connected lighting device or a network-connected appliance based on the sensed signal not being received within the time period.

4. The computer-implemented method of claim 3, wherein the sensed signal is received from a network-connected sensor.

5. The computer-implemented method of claim 3, wherein the sensed signal is received from a network-connected device.

6. A computer-implemented method for detecting a movement path in a monitored environment, the method comprising:
    generating a first movement path record by:
        collecting first node information for each of a first series of nodes, each first node information including at least one of a sensor ID or a device ID, and a trigger time,
        determining a starting node and an ending node from the first series of nodes based on respective trigger times, and
        determining a first movement path total duration time from a difference between a time of the ending node and a time of the starting node of the first series of nodes;
    storing the first movement path record with a first movement path record weight value;
    generating a second movement path record by:
        collecting second node information for each of a second series of nodes, each second node information including at least one of a sensor ID or a device ID, and a trigger time,
        determining a starting node and an ending node from the second series of nodes based on respective trigger times, and
        determining a second movement path total duration time from a difference between a time of the ending node and a time of the starting node of the second series of nodes;
    comparing the second movement path record with the first movement path record by comparing at least one of:
        the first node information for each of the first series of nodes and the second node information for each of the second series of nodes, and
        the first movement path total duration time and the second movement path total duration time;
    determining a similarity value based on comparing the second movement path record and the first movement path record;
    detecting and storing a movement path in the monitored environment based on the determined similarity value;
    determining a location-based condition from a received signal;
    determining a presence of a user is not proximate a location originating the received signal;
    determining the user is one of currently on or has completed the stored movement path; and
    alerting the user of the location-based condition based on determining the user is one of currently on or has completed the movement path corresponding to the stored movement path.

7. The computer-implemented method of claim 6, wherein the received signal is from a network-connected sensor at the location originating the received signal.

8. The computer-implemented method of claim 6, wherein the received signal is from a network-connected device at the location originating the received signal.

9. A system for detecting a movement path in a monitored environment, the system comprising:
    a memory configured to store processor-readable instructions; and
    one or more processors in communication with the memory, the one or more processors configured to execute the processor-readable instructions to:
        generate a first movement path record by:
            collecting first node information for each of a first series of nodes, each first node information including at least one of a sensor ID or a device ID, and a trigger time,
            determining a starting node and an ending node from the first series of nodes based on respective trigger times, and
            determining a first movement path total duration time from a difference between a time of the ending node and a time of the starting node of the first series of nodes;
        cause the first movement path record to be stored with a first movement path record weight value;
        generate a second movement path record by:
            collecting second node information for each of a second series of nodes, each second node information including at least one of a sensor ID or a device ID, and a trigger time,
            determining a starting node and an ending node from the second series of nodes based on respective trigger times, and
            determining a second movement path total duration time from a difference between a time of the ending node and a time of the starting node of the second series of nodes;
        compare the second movement path record with the first movement path record by comparing at least one of:
            the first node information for each of the first series of nodes and the second node information for each of the second series of nodes, and
            the first movement path total duration time and the second movement path total duration time;
        determine a similarity value based on comparing the second movement path record and the first movement path record by performing unsupervised machine learning by at least one of graph data mining and association analysis on the first and second movement path records, wherein the unsupervised machine learning is performed remotely and off-line from the monitored environment; and detect a movement path in the monitored environment based on the determined similarity value.

10. A system for detecting a movement path in a monitored environment, the system comprising:

a memory configured to store processor-readable instructions; and one or more processors in communication with the memory, the one or more processors configured to execute the processor-readable instructions to:

generate a first movement path record by:
collecting first node information for each of a first series of nodes, each first node information including at least one of a sensor ID or a device ID, and a trigger time,
determining a starting node and an ending node from the first series of nodes based on respective trigger times, and
determining a first movement path total duration time from a difference between a time of the ending node and a time of the starting node of the first series of nodes;

cause the first movement path record to be stored with a first movement path record weight value;

generate a second movement path record by:
collecting second node information for each of a second series of nodes, each second node information including at least one of a sensor ID or a device ID, and a trigger time,
determining a starting node and an ending node from the second series of nodes based on respective trigger times, and
determining a second movement path total duration time from a difference between a time of the ending node and a time of the starting node of the second series of nodes;

compare the second movement path record with the first movement path record by comparing at least one of:
the first node information for each of the first series of nodes and the second node information for each of the second series of nodes, and
the first movement path total duration time and the second movement path total duration time;

determine a similarity value based on comparing the second movement path record and the first movement path record;

detect a movement path in the monitored environment based on the determined similarity value;

a first network-connected sensor or device, configured to:
sense a user presence proximate a first media presentation device and determining a media content identifier of media content that may be played back on the first media presentation device;

a second network-connected sensor or device, configured to:
sense the user presence at a first time and storing a queue position of the media content that may be played back on the first media presentation device corresponding to the first time, wherein the one or more processors are further configured to execute the processor-readable instructions to:

determine an anticipated movement path from a plurality of stored movement path records based on a similarity of values between one of the stored movement path records and the sensed user presence at the second network-connected sensor or device;

determine a destination of the anticipated movement path and a second media presentation device proximate the destination; and request the media content identifier of the media content and queue the media content at the queue position for playback at the second media presentation device; and a third network-connected sensor or device, configured to:
sense the user presence and subsequently initiating playback of the media content at the queue position on the second media presentation device.

11. A system for detecting a movement path in a monitored environment, the system comprising:

a memory configured to store processor-readable instructions; and one or more processors in communication with the memory, the one or more processors configured to execute the processor-readable instructions to:

generate a first movement path record by:
collecting first node information for each of a first series of nodes, each first node information including at least one of a sensor ID or a device ID, and a trigger time,
determining a starting node and an ending node from the first series of nodes based on respective trigger times, and
determining a first movement path total duration time from a difference between a time of the ending node and a time of the starting node of the first series of nodes;

store the first movement path record with a first movement path record weight value;

generate a second movement path record by:
collecting second node information for each of a second series of nodes, each second node information including at least one of a sensor ID or a device ID, and a trigger time,
determining a starting node and an ending node from the second series of nodes based on respective trigger times, and
determining a second movement path total duration time from a difference between a time of the ending node and a time of the starting node of the second series of nodes;

compare the second movement path record with the first movement path record by comparing at least one of:
the first node information for each of the first series of nodes and the second node information for each of the second series of nodes, and
the first movement path total duration time and the second movement path total duration time;

determine a similarity value based on comparing the second movement path record and the first movement path record;

detect and recording a movement path in the monitored environment based on the determined similarity value;

determine whether a sensed signal is received within a time period proximate a time value of the movement path record;

perform one of:
    incrementing a weight value of the movement path record when the sensed signal is received within the time period, or
    decrementing the weight value of the movement path record when the sensed signal is not received within the time period; and
cause a power off signal to be sent to at least one of a network-connected lighting device or a network-connected appliance based on the sensed signal not being received within the time period.

12. The system of claim 11, further comprising a network-connected sensor, wherein the sensed signal is received from the network-connected sensor.

13. The system of claim 11, further comprising a network-connected device, wherein the sensed signal is received from the network-connected device.

\* \* \* \* \*